United States Patent
Oh et al.

(10) Patent No.: US 10,075,316 B2
(45) Date of Patent: Sep. 11, 2018

(54) METHOD FOR TRANSMITTING AND RECEIVING DATA IN WIRELESS LOCAL AREA NETWORK AND APPARATUS FOR THE SAME

(71) Applicant: NEWRACOM, INC., Irvine, CA (US)

(72) Inventors: Jong-Ee Oh, Irvine, CA (US); Yongjin Kwon, Irvine, CA (US); Hyungu Park, Irvine, CA (US); Je-Hun Lee, Irvine, CA (US); Hong Soog Kim, Irvine, CA (US); Hyoung Jin Kwon, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 15/623,090

(22) Filed: Jun. 14, 2017

(65) Prior Publication Data

US 2017/0288930 A1    Oct. 5, 2017

Related U.S. Application Data

(63) Continuation of application No. 14/664,690, filed on Mar. 20, 2015, now Pat. No. 9,712,362.
(Continued)

(30) Foreign Application Priority Data

Dec. 18, 2014 (KR) ............ 10-2014-0183466
Jan. 14, 2015 (KR) ............ 10-2015-0006890

(51) Int. Cl.
*H04L 27/26* (2006.01)
*H04L 1/00* (2006.01)
(Continued)

(52) U.S. Cl.
CPC ........ *H04L 27/2626* (2013.01); *H04L 5/0044* (2013.01); *H04L 5/0094* (2013.01);
(Continued)

(58) Field of Classification Search
CPC ............ H04L 27/2602; H04L 27/2626; H04L 27/2647; H04L 5/0023; H04L 5/0044;
(Continued)

(56) References Cited

U.S. PATENT DOCUMENTS 7,474,676 B2 * 1/2009 Tao ................. H04L 1/1628
                                                370/469
8,370,546 B2 * 2/2013 Trainin ............ H04L 1/1621
                                                370/412
(Continued)

*Primary Examiner* — Ahmed Elallam

(57) ABSTRACT

Disclosed are a method and an apparatus for transmitting and receiving data in a Wireless Local Area Network (WLAN) system. A method for transmitting data may comprise generating a physical layer (PHY) frame including a payload in which a plurality of Medium Access Control protocol data units (MPDUs) are multiplexed; and transmitting the PHY frame, wherein the PHY frame includes information on subcarriers occupied by each of the plurality of MPDUs in an Orthogonal Frequency Division Multiplexing (OFDM) symbol of the payload. Therefore, data transmission efficiency in a WLAN system can be enhanced.

19 Claims, 15 Drawing Sheets

Related U.S. Application Data

(60) Provisional application No. 61/981,427, filed on Apr. 18, 2014, provisional application No. 61/968,309, filed on Mar. 20, 2014.

(51) Int. Cl.
*H04L 5/00* (2006.01)
*H04W 84/12* (2009.01)

(52) U.S. Cl.
CPC ........ *H04L 27/2602* (2013.01); *H04L 5/0023* (2013.01); *H04L 27/2647* (2013.01)

(58) Field of Classification Search
CPC ... H04L 5/0094; H04L 1/1614; H04L 1/1621; H04L 1/1628; H04L 1/1635; H04L 1/1642; H04W 84/12
See application file for complete search history.

(56) References Cited

U.S. PATENT DOCUMENTS

| | | | |
|---|---|---|---|
| 9,253,290 B2* | 2/2016 | Asterjadhi | H04L 69/04 |
| 9,337,961 B2* | 5/2016 | Wentink | H04L 1/1607 |
| 9,712,362 B2* | 7/2017 | Oh | H04L 27/2626 |
| 9,825,738 B2* | 11/2017 | Kwon | H04L 5/0007 |
| 9,929,847 B2* | 3/2018 | Asterjadhi | H04L 5/0055 |
| 2006/0048034 A1* | 3/2006 | Cho | H04L 1/1614 |
| | | | 714/749 |
| 2016/0028452 A1* | 1/2016 | Chu | H04J 11/00 |
| | | | 375/267 |
| 2017/0149547 A1* | 5/2017 | Kim | H04L 5/0055 |
| 2017/0353887 A1* | 12/2017 | Kim | H04W 28/04 |

* cited by examiner

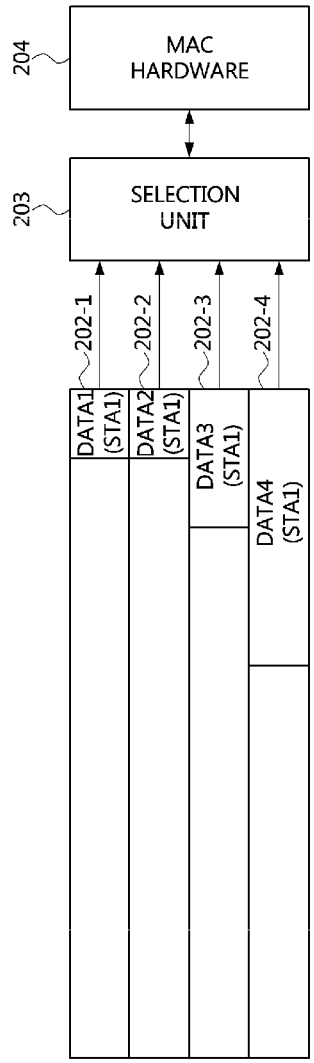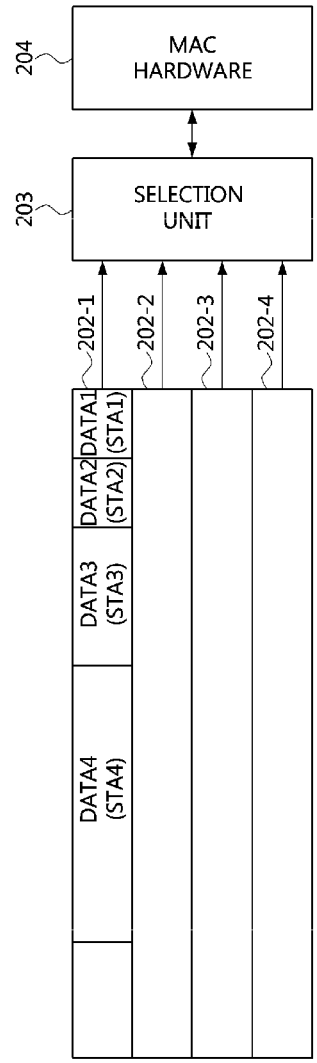

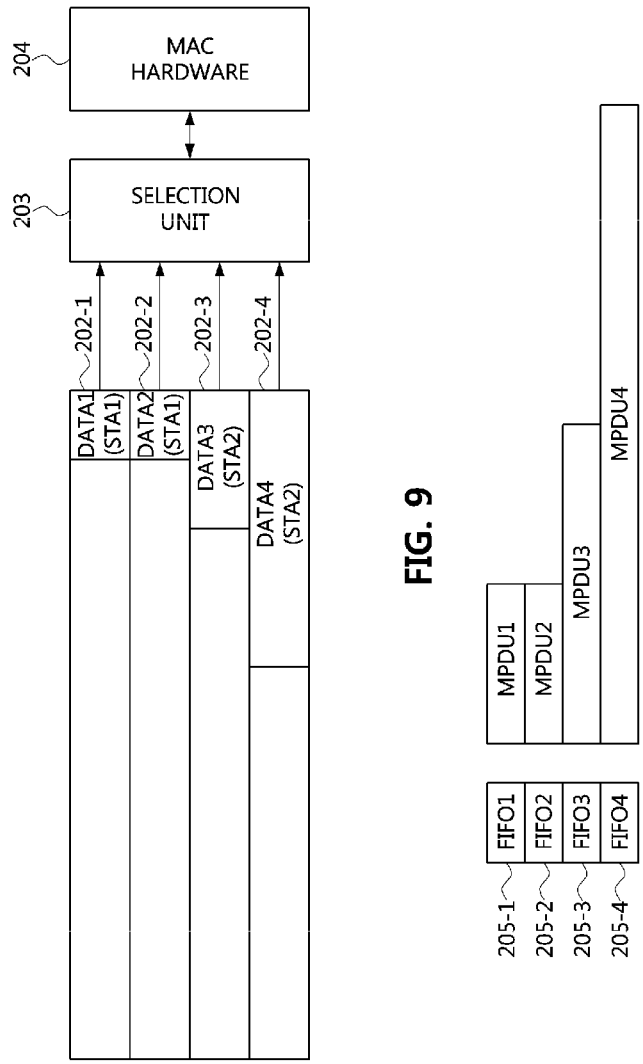

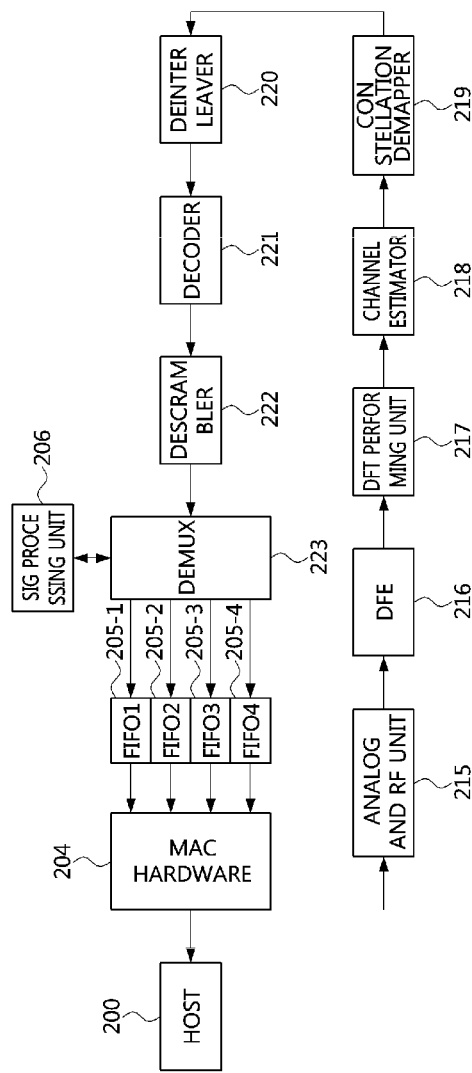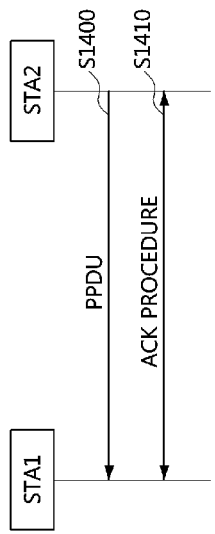

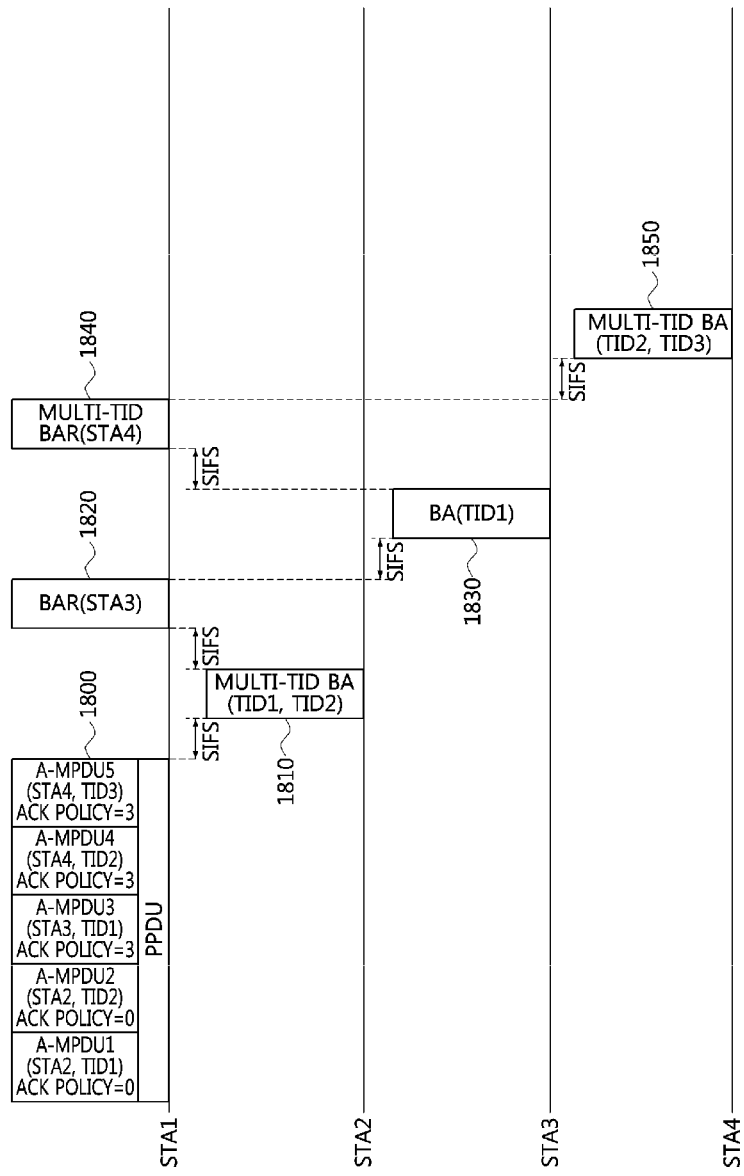

METHOD FOR TRANSMITTING AND RECEIVING DATA IN WIRELESS LOCAL AREA NETWORK AND APPARATUS FOR THE SAME

CLAIM FOR PRIORITY

This application is a continuation of U.S. patent application Ser. No. 14/664,690 filed on Mar. 20, 2015, which claims priorities to U.S. Patent Application No. 61/968,309 filed on Mar. 20, 2014, U.S. Patent Application No. 61/981,427 filed on Apr. 18, 2014, Korean Patent Application No. 10-2014-0183466 filed on Dec. 18, 2014, and Korean Patent Application No. 10-2015-0006890 filed on Jan. 14, 2015, the entire contents of which are hereby incorporated by reference.

BACKGROUND

1. Technical Field

The present invention relates to a data transceiving technology in wireless local area network, and more particularly, to a method for data transceiving method based on data multiplexing and apparatus for the same.

2. Related Art

With the development of information communication technologies, a variety of wireless communication technologies have been developed. Among these technologies, wireless local area network (WLAN) is a technology that Internet access is possible in a wireless way in homes, business or specific service providing areas, using portable terminal such as personal digital assistant (PDA), a laptop computer, a portable multimedia player (PMP), or the like, based on wireless frequency technologies.

WLAN technologies is created and standardized by the IEEE 802.11 Working Group under IEEE 802 Standard Committee. IEEE 802.11a provides a maximum PHY data rate of 54 Mbps using a 5 GHz unlicensed band. IEEE 802.11b provides a maximum PHY data rate of 11 Mbps by applying a direct sequence spread spectrum (DSSS) modulation at 2.4 GHz. IEEE 802.11g provides a maximum PHY data rate of 54 Mbps by applying orthogonal frequency division multiplexing (OFDM) at 2.4 GHz. IEEE 802.11n provides a PHY data rate of 300 Mbps using two spatial streams and bandwidth of 40 MHz, and provides a PHY data rate of 600 Mbps using four spatial streams and bandwidth of 40 MHz.

As such WLAN technology becomes more prevalent and its applications become more diverse, there is increasing demand for new WLAN technology that can support a higher throughput than IEEE 802.11n. Very high throughput (VHT) WLAN technology, that is one of the IEEE 802.11 WLAN technologies, is proposed to support a data rate of 1 Gbps and higher. IEEE 802.11ac has been developed as a standard for providing VHT in the 5 GHz band, and IEEE 802.11ad has been developed as a standard for providing VHT in the 60 GHz band.

In addition to the above-described standards, various standards on WLAN technologies have been developed, and are being developed. As representative recent technologies, a WLAN technology according to IEEE 802.11af standard is a technology which has been developed for WLAN operation in TV white space bands, and a WLAN technology according to IEEE 802.11ah standard is a technology which has been developed for supporting a great number of stations operating with low power in sub 1 GHz band, and a WLAN technology according to IEEE 802.11ai standard is a technology which has been developed for supporting fast initial link setup (FILS) in WLAN systems. Also, IEEE 802.11ax standard is being developed for enhancing frequency efficiency of dense environments in which numerous access points and stations exist.

In the system based on such the WLAN technologies, an access point (or, a station) may generate an aggregated Medium Access Control (MAC) protocol data unit (A-MPDU) by aggregating a plurality of MPDUs which belong to the same access category (AC) and have the same destination, and transmit the generated A-MPDU.

On the other hand, if multi-user multiple-input multiple-output (MU-MIMO) transmission is used, an access point may transmit a plurality of MPDUs through a single frame even when the plurality of MPDUs belong to different access categories and have different destinations. However, such the transmission is permitted only for downlink MU-MIMO transmission. In addition, in order to support the downlink MU-MIMO transmission, a procedure in which an access point transmits null data packets (NDP) to stations participating the MU-MIMO transmission, a procedure in which the stations which received the NDP perform channel estimation based on the NDP and sequentially report results of the channel estimation to the access point, and a procedure in which the access point controls interferences between the stations and performs the MU-MIMO transmission based on the results of channel estimation are necessary.

In the downlink MU-MIMO transmission, if a large amount of data is to be transmitted, an overhead caused by the procedure for obtaining the results of channel estimation is relatively low. However, if a small amount of data (i.e. small packet) is to be transmitted, the overhead caused by the procedure for obtaining the results of channel estimation becomes relatively high so that efficiency of resources used for supporting the MU-MIMO transmission becomes lower. Also, a proportion of small packets having a size of less than 128 bytes occupies almost 30% of whole packets in a WLAN system, and overhead caused by preambles such as short training field (STF), long training field (LTF), etc. is considerably high in transmission of the small packets.

SUMMARY

The present invention is directed to providing a method and an apparatus for transmitting and receiving data for a plurality of stations and/or access categories based on data multiplexing.

The present invention is also directed to providing a method for transmitting and receiving data, which can implement an Orthogonal Frequency Division Multiple Access (OFDMA) while minimizing structural changes of the conventional WLAN transceiving apparatus.

The present invention is also directed to providing a method for transmitting and receiving data based on an acknowledgment (ACK) policy for a plurality of data multiplexed in a Physical Layer Convergence Procedure (PLCP) Protocol Data Unit (PPDU).

One aspect of the present invention provides a method for transmitting data, performed in a station, the method comprises: generating a physical layer (PHY) frame including a payload in which a plurality of Medium Access Control protocol data units (MPDUs) are multiplexed; and transmitting the PHY frame, wherein the PHY frame includes information on subcarriers occupied by each of the plurality of MPDUs in an Orthogonal Frequency Division Multiplexing (OFDM) symbol of the payload.

Here, the plurality of MPDUs have one or more destination addresses or belong to one or more access categories (ACs).

Here, the information on subcarriers include information on the numbers or proportions of subcarriers occupied by each of the plurality of MPDUs in the OFDM symbol of the payload.

Here, the information on subcarriers include an identifier corresponding to one or more stations.

In addition, the generating the PHY frame further includes: generating a bit stream in which the plurality of MPDUs are multiplexed; performing scrambling and encoding on the bit stream; generating a complex symbol stream by performing constellation mapping on the scrambled and encoded bit stream; and generating the PHY frame including the payload comprising the complex symbol stream.

Another aspect of the present invention provides a method for receiving data, performed in a station, the method comprises: receiving a physical layer (PHY) frame including a payload in which a plurality of Medium Access Control protocol data units (MPDUs) are multiplexed; obtaining information on subcarriers occupied by each of the plurality of MPDUs in an Orthogonal Frequency Division Multiplexing (OFDM) symbol of the payload from the PHY frame; and obtaining at least one MPDU included in the payload based on the information on subcarriers.

In addition, the obtaining at least one MPDU further includes: generating a first bit stream by performing constellation demapping on the payload; generating a second bit stream in which the plurality of MPDUs are included by performing decoding and descrambling on the first bit stream; and obtaining at least one MPDU from the second bit stream based on the information on subcarriers.

Here, the plurality of MPDUs have one or more destination addresses or belong to one or more access categories (ACs).

Here, the information on subcarriers include information on the numbers or proportions of subcarriers occupied by each of the plurality of MPDUs in the OFDM symbol of in the payload.

Here, the information on subcarriers include an identifier corresponding to one or more stations.

Another aspect of the present invention provides a method for receiving data, performed in a first station, the method comprises: receiving a physical layer convergence procedure protocol data unit (PPDU) comprising a plurality of aggregated Medium Access Control protocol data units (A-MPDUs) from a second station; and transmitting a response frame in response to the plurality of A-MPDUs based on respective ACK policies of the plurality of A-MPDUs when the plurality of A-MPDUs belong to one or more access categories (ACs).

Here, in the transmitting the response frame, when A-MPDUs is a single MPDU, the response frame includes an ACK frame which is transmitted to the second station.

Here, the ACK frame includes identifiers for the each of the plurality of A-MPDUs.

Here, the identifiers indicate information on a type of the AC.

Here, in the transmitting the response frame, when A-MPDUs includes a plurality of MPDUs, the response frame includes a BA frame which is transmitted to the second station.

Here, the BA frame includes at least one of identifiers of the each of the plurality of A-MPDUs, sequence numbers of the each of the plurality of A-MPDUs, and information indicating whether respective MPDUs included in the each of the plurality of A-MPDUs are received successfully.

Here, the information indicating whether respective MPDUs included in the each of the plurality of A-MPDUs are received successfully have a bitmap form.

In addition, when each of the plurality of A-MPDUs includes a plurality of MPDUs, the transmitting the response frame comprises: receiving a block acknowledgement request (BAR) frame from the second station; and transmitting a BA frame based on the BAR frame to the second station as the response frame to the plurality of A-MPDUs.

In order to achieve the objectives of the present invention, a first station according to an example embodiment of the present invention may comprise a processor and a memory storing at least one program codes to be executed through the processor. Also, the at least one program codes may be configured to perform receiving a PPDU comprising a plurality of A-MPDUs from a second station; and performing respective ACK procedures for the plurality of A-MPDUs based on respective ACK policies of the plurality of A-MPDUs when each of the plurality of A-MPDUs belongs to a different access category.

Here, in the performing the respective ACK procedures, when at least one of the plurality of A-MPDUs includes a single MPDU and the ACK policy for the at least one of the plurality of A-MPDUs is a normal ACK policy, the first station may transmit an ACK frame including respective identifiers for the at least one of the plurality of A-MPDUs to the second station as a response to the at least one of the plurality of A-MPDUs.

Here, in the performing the respective ACK procedures, when at least one of the plurality of A-MPDUs includes a plurality of MPDUs and the ACK policy for the at least one of the plurality of A-MPDUs is an implicit block acknowledgement (BA) policy, the first station may transmit a BA frame to the second station as a response to the at least one of the plurality of A-MPDUs.

According to the present invention, data units belonging to different access categories, data units having different destination addresses, or data units belonging to different access categories and having different destination addresses may be transmitted through a single frame. Thus, data transmission efficiency in a WLAN system can be enhanced.

Also, an OFDMA can be implemented with minimizing structures of the conventional WLAN transceiving apparatuses.

Also, an acknowledgement (ACK) procedure for a plurality of data multiplexed in a PDDU can be performed efficiently.

BRIEF DESCRIPTION OF DRAWINGS

Example embodiments of the present invention will become more apparent by describing in detail example embodiments of the present invention with reference to the accompanying drawings, in which:

FIG. 6 is a block diagram illustrating operations of the selection unit and the transmission queues in the case 1;

FIG. 7 is a block diagram illustrating operations of the selection unit and the transmission queues in the case 2;

FIG. 8 is a block diagram illustrating operations of the selection unit and the transmission queues in the case 3;

FIG. 9 is a block diagram illustrating MPDUs transmitted to the corresponding FIFO;

FIG. 13 is a block diagram illustrating a receiving end of a station performing the data multiplexing based OFDMA receiving method according to another example embodiment of the present invention;

FIG. 14 is a sequence chart illustrating a method for transmitting and receiving data according to an example embodiment of the present invention;

FIG. 18 is a concept diagram illustrating a method for transmitting and receiving a PPDU consisting of a plurality of A-MPDUs which belong to different ACs and have different destination addresses.

DESCRIPTION OF EXAMPLE EMBODIMENTS

Figure 1:
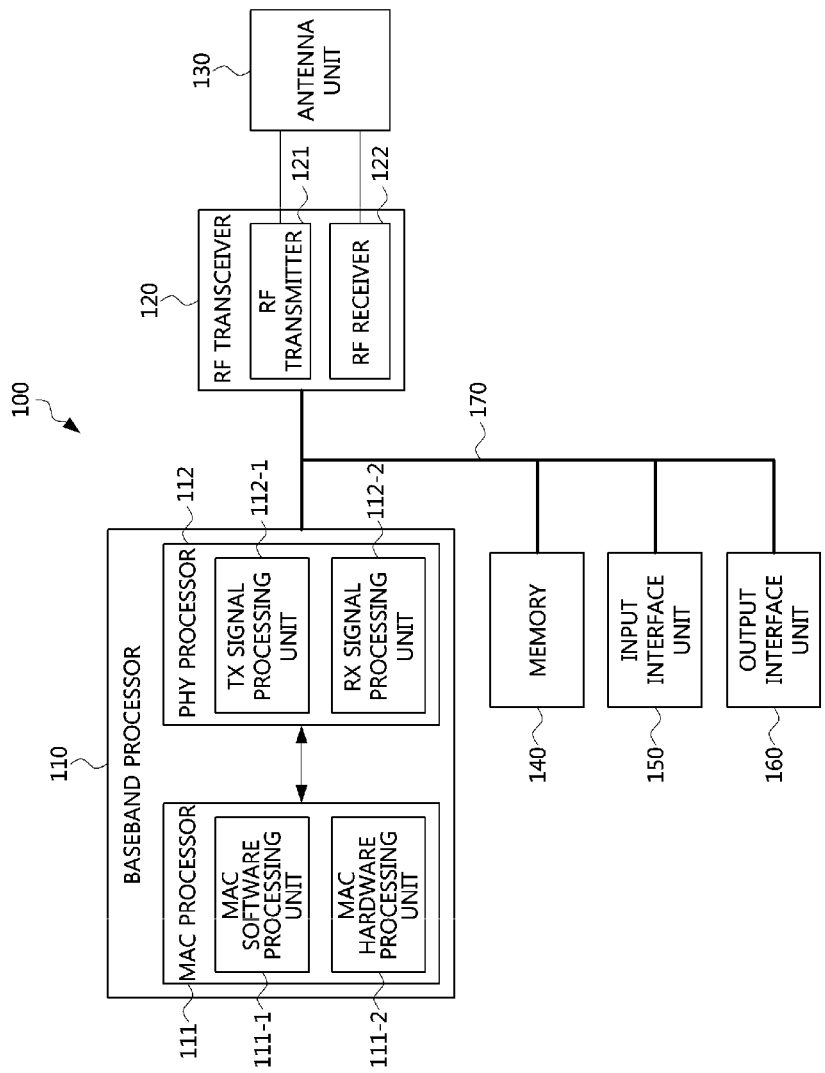
FIG. 1 is a block diagram illustrating a structure of a wireless local area network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to IEEE (Institute of Electrical and Electronics Engineers) 802.11 standard. In the plurality of WLAN devices, at least one WLAN device may be an access point and the other WLAN devices may be non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a block diagram illustrating a structure of a wireless local area network (WLAN) device.

Referring to FIG. 1, the WLAN device 100 may comprise a baseband processor 110, a radio frequency (RF) transceiver 120, an antenna unit 130, a memory 140, an input interface unit 150, an output interface unit 160, and a bus 170.

The baseband processor 110 may perform baseband-related signal processing described in this specification, and may comprise a Medium Access Control layer (MAC) processor 111 and a Physical layer (PHY) processor 112. In an example embodiment, the MAC processor 111 may comprise a MAC software processing unit 111-1 and a MAC hardware processing unit 111-2. Here, the memory 140 may store software (hereinafter, referred to as "MAC software") implementing a part of MAC layer functions, and the MAC software processing unit 111-1 may perform the part of MAC layer functions by driving the MAC software. Also, the MAC hardware processing unit 111-2 may perform other MAC layer functions through hardware (hereinafter, referred to as "MAC hardware"). However, a detail structure of the MAC processor 111 may not be limited to the above-example. The PHY processor 112 may comprise a transmit (TX) signal processing unit 112-1 and a receive (RX) signal processing unit 112-2. The baseband processor 110, the memory 140, the input interface unit 150, and the output interface unit 160 may communicate with each other via the bus 170.

The RF transceiver 120 may comprise an RF transmitter 121 and an RF receiver 122. The memory 140 may store an operating system (OS), applications, etc. as well as the MAC software. The input interface unit 150 may obtain information from a user, and the output interface unit 160 may output information to the user. The antenna unit 130 may include at least one antenna. In case that multiple antenna techniques such as multiple-input multiple-output (MIMO) techniques or multi-user MIMO (MU-MIMO) techniques are used, the antenna unit 130 may comprise a plurality of antennas.

The methods according to the present invention may be applied to a WLAN system conforming to specifications of IEEE 802.11. Also, in addition to the IEEE 802.11 WLAN system, the methods may be applied to other communication systems such as a Long Term Evolution (LTE), World Interoperability for Microwave Access (WiMax), etc.

Figure 2:
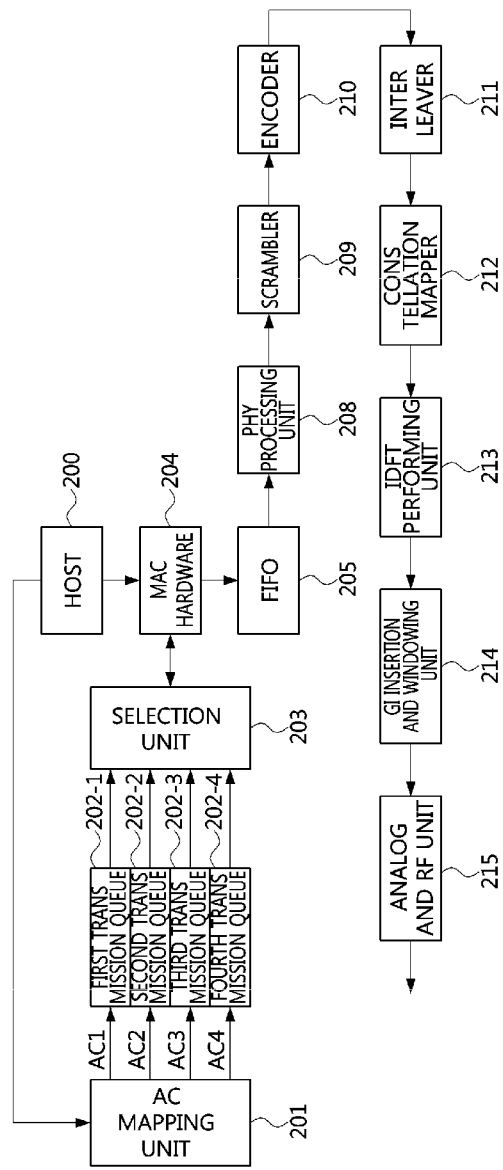
FIG. 2 is a block diagram illustrating a transmission end of a station supporting a single user.

FIG. 2 is a block diagram illustrating a transmission end of a station supporting a single user.

Referring to FIG. 2, the transmission end of the station may transmit data by using all frequency tones based on a preconfigured frequency bandwidth and a modulation and coding scheme (MCS). The transmission end of the station may comprise an upper layer, a MAC layer, a PHY layer, etc. Here, the upper layer may mean an upper layer over the MAC layer. For example, the upper layer may include a Logical Link Control (LLC) layer, etc. Also, a host 200 may be represented as the upper layer in FIG. 2.

The MAC layer may comprise an access category (AC) mapping unit 201, transmission queues 202-1, 202-2, 202-3, and 202-4, and a selection unit 203, MAC hardware 204, a First Input First Out (FIFO) 205, and so on. Here, the MAC layer may mean the MAC processor 111 illustrated in FIG. 1.

The PHY layer may comprise a PHY processing unit 208, a scrambler 209, an encoder 210, an interleaver 211, a constellation mapper 212, an inverse discrete Fourier Transform (IDFT) performing unit 213, a Guard Interval (GI) insertion and windowing unit 214, an analog and RF unit 215, and so on. Here, a TX signal processing unit 112-1 illustrated in FIG. 1 may comprise the PHY processing unit 208, the scrambler 209, the encoder 210, the interleaver 211, the constellation mapper 212, the IDFT performing unit 213, the GI insertion and windowing unit 214, etc. Also, an RF transmitter 121 illustrated in FIG. 1 may mean the analog and RF unit 215.

When data to be transmitted exist in the host 200, the corresponding data may be transmitted to the AC mapping unit 201. The data transmitted from the host 200 to the AC mapping unit 201 may be a MAC service data unit (MSDU). The AC mapping unit 201 may configure an access category for each data based on quality of service (QoS) demanded for the each data.

Here, access categories are classified into AC_VO, AC_VI, AC_BE, and AC_BK. The AC_VO may have the highest priority among ACs, and for example mean an AC defined for transmission of voice data, etc. The AC_VI may have the next highest priority, and for example mean an AC defined for transmission of video data, etc. The AC_BE may have the next highest priority, and for example mean an AC defined for data to be transmitted in best effort (BE) mode. The AC_BK may have the lowest priority among ACs, and for example mean an AC defined for transmission of back ground data, etc.

For example, the AC mapping unit 201 may set an AC for data (e.g. voice data) having the highest priority to AC_VO (i.e. AC1). The data whose AC is set to AC_VO (AC1) may be transmitted to the first transmission Queue 202-1. The AC mapping unit 201 may set an AC for data having the next priority (e.g. video data) to AC_VI (i.e. AC2). The data whose AC is set to AC_VI (AC2) may be transmitted to the second transmission queue 202-2. The AC mapping unit 201 may set an AC for data having the next priority (e.g. data to be transmitted in best effort mode) to AC_BE (i.e. AC3). The data whose AC is set to AC_BE (AC3) may be transmitted to the third transmission queue 202-3. The AC mapping unit 201 may set an AC for data having the lowest priority (e.g. data to be transmitted in background) to AC_BK (i.e. AC4). The data whose AC is set to AC_BK (AC3) may be transmitted to the fourth transmission queue 202-4.

The transmission queues 202-1, 202-2, 202-3, and 202-4 may transmit data to the selection unit 203 based on an arbitrary interframe space (AIFS) and a backoff procedure defined for each AC. For example, the first transmission queue 202-1 may transmit the data to the selection unit 203 after a time duration of (AIFS+contention window (CW)) according to AC_VO. The second transmission queue 202-2 may transmit the data to the selection unit 203 after a time duration of (AIFS+CW) according to AC_VI. The third transmission queue 202-3 may transmit the data to the selection unit 203 after a time duration of (AIFS+CW) according to AC_BE. The fourth transmission queue 202-4 may transmit the data to the selection unit 203 after a time duration of (AIFS+CW) according to AC_BK.

The selection unit 203 may obtain data for a single AC from the transmission queues 202-1, 202-2, 202-3, and 202-4. If data for at least two ACs are transmitted simultaneously from the transmission queues 202-1, 202-2, 202-3, and 202-4, the selection unit 203 may select data for an AC having the highest priority among the data transmitted from the transmission queues. The selection unit 203 may transmit the data for the single AC which is obtained from the transmission queues 202-1, 202-2, 202-3, and 202-4 to the MAC hardware 204.

The MAC hardware 204 may add a MAC header, a Cyclic Redundancy Check (CRC) value, etc. to the data received from the selection unit 203. Also, the MAC hardware 204 may further add MAC pad bits to the data as necessary. Through this, a MAC protocol data unit (MPDU) may be generated, and the MPDU may be transmitted to the FIFO 205 which is a MAC-PHY interface.

The FIFO 205 may transmit the MPDU received from the MAC hardware 204 to the PHY processing unit 208. Here, the MPDU transmitted from the FIFO 205 to the PHY processing unit 208 may be a bit stream.

The PHY processing unit 208 may add a service field to the head part of the bit stream received from the FIFO 205. Here, the service field may have a size of 16 bits, each of all bits being "0." Also, the PHY processing unit 208 may add tail bits to the tail part of the bit stream, if binary convolutional coding (BCC) is performed later. The tail bits may have a size of 6 bits, each of all bits being "0." Also, the PHY processing unit 208 may add PHY pad bits to the tail part of the bit stream, if necessary. All of the PHY pad bits may be configured as "0." The PHY processing unit 208 may transmit the processed bit stream to the scrambler 209.

The scrambler 209 may perform scrambling on the bit stream received from the PHY processing unit 208, and then transmit the scrambled bit stream to the encoder 210. Here, the scrambler 209 may not perform scrambling on the tail bits. The encoder 210 may perform encoding on the scrambled bit stream received from the scrambler 209. At this time, the encoder 210 may perform encoding such as a BCC encoding or a low density parity check (LDPC) encoding. In addition, the bit stream on which the encoding has been performed may be punctured as necessary.

After the encoding (or, the puncturing), a stream parsing on the bit stream may be performed. That is, through the stream parsing, the bit stream may be rearranged into bit streams that the number of which is identical to the number of spatial streams.

After the stream parsing, the interleaver 211 may perform interleaving on the bit stream, and transmit the bit stream on which the interleaving has been performed to the constellation mapper 212. Here, the interleaving may be performed by a BCC interleaver. Through the interleaving, the bit stream may be evenly distributed over whole frequency band so that a frequency diversity effect may be generated.

The constellation mapper 212 may perform constellation mapping on the bit stream received from the interleaver 211 so as to generate a complex symbol stream. Here, the constellation mapper 212 may perform the constellation mapping based on binary phase shift keying (BPSK), quadrature phase shift keying (QPSK), 16-quadrature amplitude modulation (OAM), 64-QAM, 256-QAM, and so on.

After the constellation mapping, pilots may be inserted into frequency tones. In case that 20 MHz frequency bandwidth is used, pilots may be inserted into frequency tones indexes which are −21, −7, 7, and 21. In case that 40 MHz frequency bandwidth is used, pilots may be inserted into frequency tones indexes which are −53, −25, −11, 11, 25, and 53. In case that 80 MHz frequency bandwidth is used, pilots may be inserted into frequency tones indexes which are −103, −75, −39, −11, 11, 39, 75, and 103. Also, in case that 160 MHz frequency bandwidth is used, pilots may be inserted into frequency tones indexes which are −231, −203, −167, −139, −117, −89, −53, −25, 25, 53, 89, 117, 139, 167, 203, and 231.

After the insertion of the pilots, the IDFT performing unit 213 may perform IDFT on the complex symbol stream so as to generate an orthogonal frequency division multiplexing (OFDM) symbol. Alternatively, an Inverse Fast Fourier Transform (IFFT) may be performed on the complex symbol stream. The IDFT performing unit 213 may transmit the OFDM symbol to the GI insertion and windowing unit 214.

The GI insertion and windowing unit 214 may insert a GI into the OFDM symbol, and perform windowing on the OFDM symbol for smooth transition between adjacent OFDM symbols. Then, the GI insertion and windowing unit 214 may transmit the processed OFDM symbol to the analog and RF unit 215. The analog and RF unit 215 may convert the OFDM symbol which is a baseband signal into an analog signal, and transmit the converted analog signal in radio frequency.

Meanwhile, a transmission end of a station in WLAN system may generate an Aggregated MPDU (A-MPDU) by aggregating a plurality of MPDUs which belong to the same AC and have the same destination address, and transmit the generated A-MPDU to the same destination. However, in case that MU-MIMO transmission is used, the transmission end may transmit a plurality of MPDUs which belong to different ACs and have different destination addresses to different destinations by using a single frame.

Figure 3:
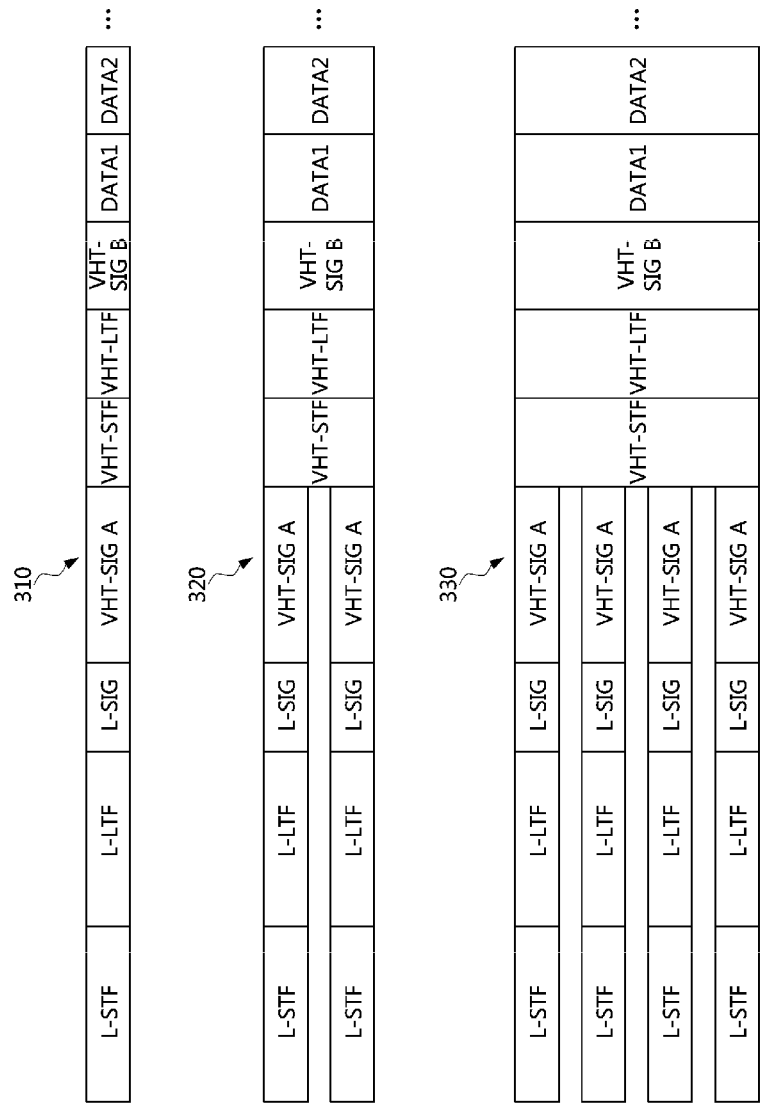
FIG. 3 is a block diagram illustrating a frame for each of bandwidths used in WLAN system according to IEEE 802.11ac.

FIG. 3 is a block diagram illustrating a frame for each of bandwidths used in WLAN system according to IEEE 802.11ac.

Referring to FIG. 3, in 20 MHz/40 MHz/80 MHz frames 310, 320, and 330 according to the IEEE 802.11ac standard, a legacy-short training field (L-STF), a legacy-long training filed (L-LTF), a legacy-signal (L-SIG) field, and a very high throughput signal A (VHT-SIG A) field may be repeated in unit of 20 MHz for legacy compatibility.

Also, in 20 MHz/40 MHz/80 MHz frames 310, 320, and 330 according to the IEEE 802.11ac standard, a very high throughput short training field (VHT-STF), a very high throughput long training filed (VHT-LTF), a very high throughput signal B (VHT-SIG B) field, and a payload (i.e. a first data field (DATA1), a second data field (DATA2), etc.) may be transmitted by maximizing frequency tones in use through channel bonding. Here, the payload may comprise a single MPDU or a plurality of MPDUs (that is, A-MPDU).

As described above, a MPDU transmitted through a frame according to the IEEE 802.11 ac standard may mean a MPDU corresponding to a single AC selected in the selection unit 203. However, when destinations of MPDUs belonging to the same AC are identical to each other, an A-MPDU may be generated by aggregating the MPDUs belonging to the same AC, and transmitted through a single frame according to the IEEE 802.11ac standard. In this case, data transmission efficiency can be enhanced.

Figure 4:
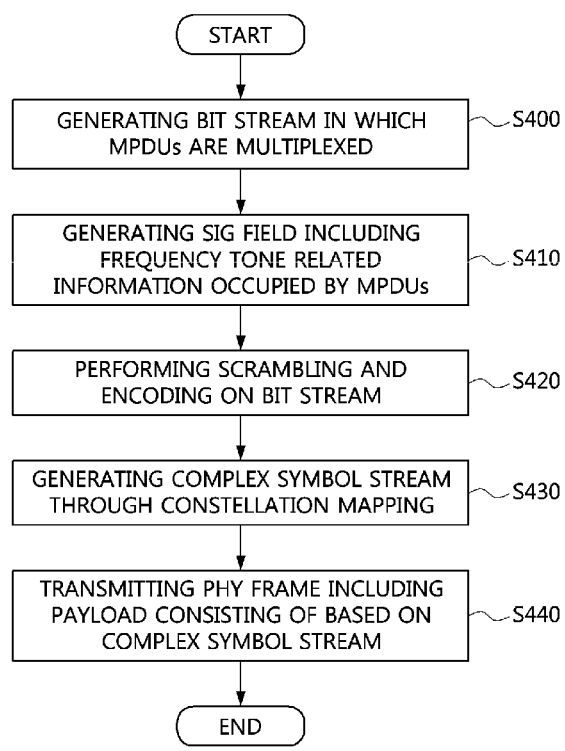
FIG. 4 is a flow chart illustrating a data multiplexing based orthogonal frequency division multiple access (OFDMA) transmission method according to an example embodiment of the present invention.
Figure 5:
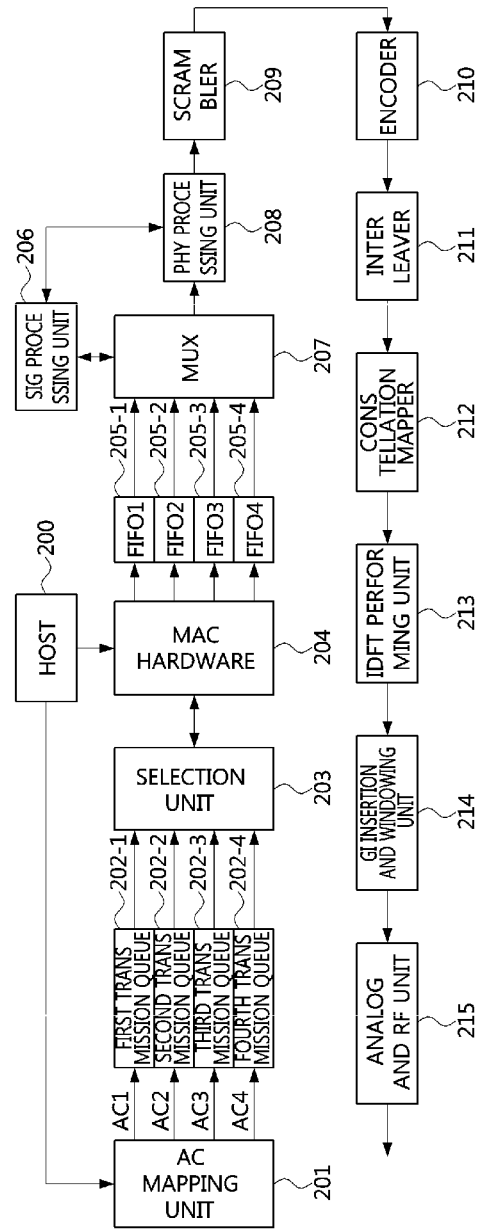
FIG. 5 is a block diagram illustrating a transmission end of a station performing a data multiplexing based OFDMA transmission method according to an example embodiment of the present invention.

FIG. 4 is a flow chart illustrating a data multiplexing based orthogonal frequency division multiple access (OFDMA) transmission method according to an example embodiment of the present invention, and FIG. 5 is a block diagram illustrating a transmission end of a station performing a data multiplexing based OFDMA transmission method according to an example embodiment of the present invention.

Here, the transmission end of station performing the data multiplexing based OFDMA transmission method may comprise components constituting the transmission end of the station illustrated in FIG. 2. Also, differences of the transmission end illustrated in FIG. 5 from the transmission end illustrated in FIG. 2 are that a plurality of FIFOs 205-1, 205-2, 205-3, and 205-4 exist, that a multiplexor (MUX) 207 is further included in the transmission end, and so on. The components of the transmission end in FIG. 5 which correspond to the components of the transmission end in FIG. 2 may perform the same functions.

Referring to FIG. 4 and FIG. 5, when data to be transmitted exist in the host 200, the corresponding data may be transmitted to the AC mapping unit 201. The data transmitted from the host 200 to the AC mapping unit 201 may mean a MSDU. The AC mapping unit 201 may set an AC (for example, AC_VO (AC1), AC_VI (AC2), AC_BE (AC3), or AC_BK (AC4)) for each data based on demanded QoS. The AC mapping unit 201 may transmit the data whose AC is set to AC_VO to the first transmission queue 202-1, the data whose AC is set to AC_VI to the second transmission queue 202-2, the data whose AC is set to AC_BE to the third transmission queue 202-3, and the data whose AC is set to AC_BK to the fourth transmission queue 202-4.

On the other hand, in a case that a plurality of data which belong to different ACs and have the same destination exist (hereinafter, referred to as "case 1"), in a case that a plurality of data which belong to the same AC and have different destinations (hereinafter, referred to as "case 2"), and in a case that a plurality of data which belong to different ACs and have different destinations (hereinafter, referred to as "case 3"), if it is determined to be efficient that data for a plurality of stations and/or access categories are transmitted through a single frame, the transmission end may transmit the data for a plurality of stations and/or access categories through a single frame.

In the following descriptions, methods for transmitting data for a plurality of stations and/or access categories through a single frame will be explained for the cases 1, 2, and 3.

FIG. 6 is a block diagram illustrating operations of the selection unit and the transmission queues in the case 1.

Referring to FIG. 6, in the case 1, the first queue 202-1 has data (DATA1) to be transmitted to a first station (STA1), and the second queue 202-2 has data (DATA2) to be transmitted to the first station (STA1), and the third queue 202-3 has data (DATA3) to be transmitted to the first station (STA1), and the fourth queue 202-4 has data (DATA4) to be transmitted to the first station (STA1). In this case, the selection unit 203 may obtain a plurality of data DATA1, DATA2, DATA3, and DATA4 from the transmission queues 202-1, 202-2, 202-3, and 202-4. The selection unit 203 may transmit the obtained plurality of data DATA1, DATA2, DATA3, and DATA4 to the MAC hardware 204.

FIG. 7 is a block diagram illustrating operations of the selection unit and the transmission queues in the case 2.

Referring to FIG. 7, in the case 2, the first queue 202-1 has data (DATA1) to be transmitted to the first station (STA1), data (DATA2) to be transmitted to a second station (STA2), data (DATA3) to be transmitted to a third station (STA3), and data (DATA4) to be transmitted to a fourth station (STA4). In this case, the selection unit 203 may obtain a plurality of data DATA1, DATA2, DATA3, and DATA4 from the first transmission queue 202-1. The selection unit 203 may transmit the obtained plurality of data DATA1, DATA2, DATA3, and DATA4 to the MAC hardware 204.

FIG. 8 is a block diagram illustrating operations of the selection unit and the transmission queues in the case 3.

Referring to FIG. 8, in the case 3, the first queue 202-1 has data (DATA1) to be transmitted to the first station (STA1), and the second queue 202-2 has data (DATA2) to be transmitted to the first station (STA1), and the third queue 202-3 has data (DATA3) to be transmitted to the second station (STA2), and the fourth queue 202-4 has data (DATA4) to be transmitted to the second station (STA2). In this case, the selection unit 203 may obtain a plurality of data DATA1, DATA2, DATA3, and DATA4 from the transmission queues 202-1, 202-2, 202-3, and 202-4. The selection unit 203 may transmit the obtained plurality of data DATA1, DATA2, DATA3, and DATA4 to the MAC hardware 204.

After the above-described procedures, operations performed in the MAC hardware 204 are the same in the cases 1, 2, and 3. Thus, the operations performed in the MAC hardware 204 will be explained by referring to FIG. 4 and FIG. 5.

The MAC hardware 204 may generate MPDUs each of which corresponds to each of the plurality of data DATA1, DATA2, DATA3, and DATA4 by adding a MAC header, a CRC value, etc. to each of the plurality of data DATA1, DATA2, DATA3, and DATA4. That is, the MAC hardware 204 may generate a MPDU1 by adding a MAC header and a CRC value to the DATA1, a MPDU2 by adding a MAC header and a CRC value to the DATA2, a MPDU3 by adding a MAC header and a CRC value to the DATA3, and a MPDU4 by adding a MAC header and a CRC value to the DATA4. The MAC hardware 204 may determine the number or proportion of frequency tones (or, subcarriers) occupied by each of the MPDUs MPDU1, MPDU2, MPDU3, and MPDU4 in an OFDM symbol within a PHY frame payload in which the MPDUs MPDU1, MPDU2, MPDU3, and MPDU4 are included.

The MAC hardware 204 may determine the number or proportion of frequency tones (or, subcarriers) occupied by each of the MPDUs MPDU1, MPDU2, MPDU3, and MPDU4 in the OFDM symbol within the PHY frame payload, generally in two manners. In the following descriptions, a method for determining the number or proportion of occupied frequency tones when the number of frequency tones (or, subcarriers) for an OFDM symbol of the PHY frame payload is 52 will be explained. Here, the number or proportion of frequency tones for the first MPDU MPDU1 in the PHY frame payload may be determined in consideration of the size of service field (e.g. 16 bits). That is, it may be presumed that MPDU1 includes the service field. Also, the number or proportion of the last MPDU MPDU4 in the PHY frame payload may be determined in consideration of the size of tail bits. That is, it may be presumed that MPDU4 includes the tail bits.

In the first manner, the MAC hardware 204 may determine the number or proportion of frequency tones for each of MPDUs MPDU1, MPDU2, MPDU3, and MPDU4 based on a size of each MPDU. For example, in case that sizes of the MPDUs are configured as 7:7:7:31, the MAC hardware 204 may determine the numbers of frequency tones occupied by MPDUs in an OFDM symbol of the PHY frame payload to be 7:7:7:31. Alternatively, the MAC hardware 204 may determine the proportion of frequency tones occupied by each of MPDUs to be 1:1:1:5 according to a predetermined rule (refer to the below table 1). Then, the MAC hardware 204 may transfer the determined number or proportion of frequency tones to the PHY layer.

In the second manner, the MAC hardware 204 may determine the number or proportion of frequency tones for each of MPDUs MPDU1, MPDU2, MPDU3, and MPDU4 based on a table representing the predefined numbers or proportions of frequency tones. Here, an example of the table may be shown as the following table 1.

TABLE 1

| Index | | 52 frequency tones | | | |
|---|---|---|---|---|---|
| 00 | Proportion | 1 | 1 | 1 | 5 |
|    | Number     | 7 | 7 | 7 | 31 |
| 01 | Proportion | 1 | 1 | 2 | 4 |
|    | Number     | 7 | 7 | 13 | 25 |

That is, the MAC hardware 204 may obtain the numbers or proportions of frequency tones which are identical to or similar with actual sizes of MPDUs MPDU1, MPDU2, MPDU3, and MPDU4 from the table, and determine the number or proportion of frequency tones occupied by each MPDU in an OFDM symbol of the PHY frame payload based on the obtained values.

As an example, when actual sizes of MPDUs are 7:7:7:31, the MAC hardware 204 may determine whether the numbers or proportions of frequency tones identical to 7:7:7:31 already exist in the table. Since the numbers or proportions of frequency tones identical to 7:7:7:31 exist in the table, the MAC hardware 204 may determine the numbers of frequency tones occupied by each of MPDUs in an OFDM symbol of the PHY frame payload to be 7:7:7:31, and determine the proportions of the frequency tones to be 1:1:1:5.

As another example, when actual sizes of MPDUs are 7:7:11:27, the MAC hardware 204 may determine whether the numbers or proportions of frequency tones identical to 7:7:11:27 already exist in the table. On the contrary to the above example, since the numbers or proportions of frequency tones identical to 7:7:11:27 do not exist in the table, the MAC hardware 204 may determine the numbers of frequency tones occupied by MPDUs in an OFDM symbol of the PHY frame payload to be the most similar values to 7:7:11:27 existing in the table. Here, the MAC hardware 204 may select the numbers or proportions of frequency tones which can minimize addition of pad bits (for example, MAC pad bits or PHY pad bits).

Therefore, the MAC hardware 204 may determine the numbers of frequency tones occupied by MPDUs MPDU1, MPDU2, MPDU3, and MPDU4 in an OFDM symbol to be 7:7:13:25, and determine the proportions of frequency tones to be 1:1:2:4. In this case, the MAC hardware 204 may add MAC pad bits to each of MPDUs based on the determined numbers or proportions of frequency tones. The MAC hardware 204 may transfer at least one of the determined numbers of frequency tones, the determined proportions of frequency tones, an index for the numbers of frequency tones, and an index for the proportions of frequency tones to the PHY layer.

Then, the MAC hardware 204 may transmit MPDU1 to FIFO1 205-1, MPDU2 to FIFO2 205-2, MPDU3 to FIFO3 205-3, and MPDU4 to FIFO4 205-4.

FIG. 9 is a block diagram illustrating MPDUs transmitted to the corresponding FIFO.

Referring to FIG. 9, MPDU1 generated based on DATA1 may be transmitted from the MAC hardware 204 to FIFO1 205-1. MPDU2 generated based on DATA2 may be transmitted from the MAC hardware 204 to FIFO2 205-2. MPDU3 generated based on DATA3 may be transmitted from the MAC hardware 204 to FIFO3 205-3. MPDU4 generated based on DATA4 may be transmitted from the MAC hardware 204 to FIFO4 205-4. For example, sizes of MPDU1, MPDU2, MPDU3, and MPDU4 may be 7:7:13:25.

Re-referring to FIG. 4 and FIG. 5, each of the plurality of FIFOs 205-1, 205-2, 205-3, and 205-4 may transmit at least one MPDU received from the MAC hardware 204 to the MUX 207. The MUX 207 may generate a bit stream by multiplexing the plurality of MPDUs (i.e. MPDU1, MPDU2, MPDU3, and MPDU4) (S400). Here, the MUX 207 may multiplex the plurality of MPDUs in a single bit stream based on information on frequency tones occupied by each MPDU (e.g. the numbers or proportions of frequency tones). The MUX 207 may transmit the generated bit stream to the PHY processing unit 208.

The PHY processing unit 208 may add a service field and tail bits to the bit steam received from the MUX 207, and add PHY pad bits to the bit stream if necessary. Specifically, the PHY processing unit 208 may add the service field in the first 16 bits of the first MPDU of the bit stream in which the plurality of MPDUs are multiplexed.

On the other hand, since data transmitted from MAC layer are composed in unit of 8 bits (i.e. 1 byte), among OFDM symbols generated based on the bit stream in which the plurality of MPDUs are multiplexed, the proportions of the plurality of MPDUs in the last OFDM symbol may not be exactly matched to the numbers or proportions of frequency tones determined to be occupied by respective MPDUs. Thus, the PHY processing unit 208 may add 0 to 7 PHY pad bits to each of the plurality of MPDUs in the last OFDM symbol. In this case, the PHY processing unit 208 may add the PHY pad bits in consideration of tail bits to be added to the tail of the last MPDU in the bit stream in which the plurality of MPDUs are multiplexed.

Also, if a BCC encoding is to be performed later, the PHY processing unit 208 may add tail bits to the tail part of the last MPDU in the bit stream in which the plurality of MPDUs are multiplexed. The tail bits may have a size of (the number of BCC encoders 6), all of the tail bits being 0. The tail bits are not scrambled in a later scrambling procedure.

Meanwhile, the SIG processing unit 206 may generate a SIG field (i.e. a SIG A field and/or a SIG B field) including information on frequency tones occupied by each of MPDUs in an OFDM symbol of the PHY frame payload (S410). The information on frequency tones (hereinafter, also referred to as "frequency tone related information") may include at least one of the numbers of frequency tones, the proportions of frequency tones, an index of the numbers of frequency tones, and an index of the proportions of frequency tones. Here, the SIG A field and the SIG B field may mean SIG fields defined for WLAN systems according to IEEE 802.11 n/ac/ax standards. An example of the frequency tone related information when 52 frequency tones exist in a 20 MHz band is shown in the following table 2.

TABLE 2

| | | 52 frequency tones | | | | | | | |
|---|---|---|---|---|---|---|---|---|---|
| Index | # of MPDUs | 2 | | 3 | | | 4 | | |
| 00 | Proportion | 1 | 7 | 1 | 1 | 6 | 1 | 1 | 1 | 5 |
| | Numbers | 7 | 45 | 7 | 7 | 38 | 7 | 7 | 7 | 31 |
| 01 | Proportion | 2 | 6 | 1 | 2 | 5 | 1 | 1 | 2 | 4 |
| | Numbers | 13 | 39 | 7 | 13 | 32 | 7 | 7 | 13 | 25 |
| 10 | Proportion | 3 | 5 | 2 | 2 | 4 | 1 | 2 | 2 | 3 |
| | Numbers | 20 | 32 | 13 | 13 | 26 | 7 | 13 | 13 | 19 |
| 11 | Proportion | 4 | 4 | 2 | 3 | 3 | 2 | 2 | 2 | 2 |
| | Numbers | 26 | 26 | 13 | 19 | 20 | 13 | 13 | 13 | 13 |

When an index indicating the numbers or proportions of frequency tones which is included in the SIG field is "00," if two MPDUs exist in the PHY frame payload, the first MPDU occupies 7 frequency tones, and the second MPDU occupies 45 frequency tones. Also, if three MPDUs exist in the PHY frame payload, the first MPDU occupies 7 frequency tones, and the second MPDU occupies 7 frequency tones, and the third MPDU occupies 38 frequency tones. Also, if four MPDUs exist in the PHY frame payload, the first MPDU occupies 7 frequency tones, and the second MPDU occupies 7 frequency tones, and the third MPDU occupies 7 frequency tones, and the fourth MPDU occupies 31 frequency tones. When the index indicating the numbers or proportions of frequency tones which is included in the SIG field is "01," "10," or "11," each of MPDUs may occupy the corresponding number of frequency tones in the manner which is identical to the above-described example.

An example of the frequency tone related information when 108 frequency tones exist in a 40 MHz band is shown in the following table 3, and an example of information on frequency tones when 234 frequency tones exist in a 80 MHz band is shown in the following table 4. Indexes included in the tables 3 and 4 may represent the numbers or proportions of frequency tones occupied by respective MPDUs in the manner which is identical to the above-described example of the table 2.

TABLE 3

| | | 108 frequency tones | | | | | | | |
|---|---|---|---|---|---|---|---|---|---|
| Index | # of MPDUs | 2 | | 3 | | | 4 | | |
| 00 | Proportion | 1 | 7 | 1 | 1 | 6 | 1 | 1 | 1 | 5 |
| | Numbers | 14 | 94 | 14 | 14 | 80 | 14 | 14 | 14 | 66 |
| 01 | Proportion | 2 | 6 | 1 | 2 | 5 | 1 | 1 | 2 | 4 |
| | Numbers | 27 | 81 | 14 | 27 | 67 | 14 | 14 | 27 | 54 |
| 10 | Proportion | 3 | 5 | 2 | 2 | 4 | 1 | 2 | 2 | 3 |
| | Numbers | 41 | 67 | 27 | 27 | 54 | 14 | 27 | 27 | 40 |
| 11 | Proportion | 4 | 4 | 2 | 3 | 3 | 2 | 2 | 2 | 2 |
| | Numbers | 54 | 54 | 27 | 40 | 41 | 27 | 27 | 27 | 27 |

TABLE 4

| | | 234 frequency tones | | | | | | | |
|---|---|---|---|---|---|---|---|---|---|
| Index | # of MPDUs | 2 | | 3 | | | 4 | | |
| 00 | Proportion | 1 | 7 | 1 | 1 | 6 | 1 | 1 | 1 | 5 |
| | Numbers | 29 | 205 | 29 | 29 | 176 | 29 | 29 | 29 | 147 |
| 01 | Proportion | 2 | 6 | 1 | 2 | 5 | 1 | 1 | 2 | 4 |
| | Numbers | 59 | 175 | 29 | 59 | 146 | 29 | 29 | 59 | 117 |
| 10 | Proportion | 3 | 5 | 2 | 2 | 4 | 1 | 2 | 2 | 3 |
| | Numbers | 88 | 146 | 59 | 59 | 116 | 29 | 59 | 59 | 87 |
| 11 | Proportion | 4 | 4 | 2 | 3 | 3 | 2 | 2 | 2 | 2 |
| | Numbers | 117 | 117 | 59 | 87 | 88 | 58 | 58 | 59 | 59 |

Also, the information on frequency tones occupied by MPDUs may further include at least one of information on a frequency bandwidth through the PHY frame is transmitted, Modulation and Coding Scheme (MCS) information, and identification information (e.g. association identifier (AID), partial AID (PAID), group ID, etc.) for at least one station which will receive the MPDUs included in the PHY frame payload. If the PHY frame is transmitted in unicast manner, AID or PAID may be used as the identification information for the at least one station. If the PHY frame is transmitted in multicast manner, a group ID may be used as the identification information for the at least one station.

Then, the PHY processing unit 208 may transmit the processed bit stream to the scrambler 209.

Figure 10:
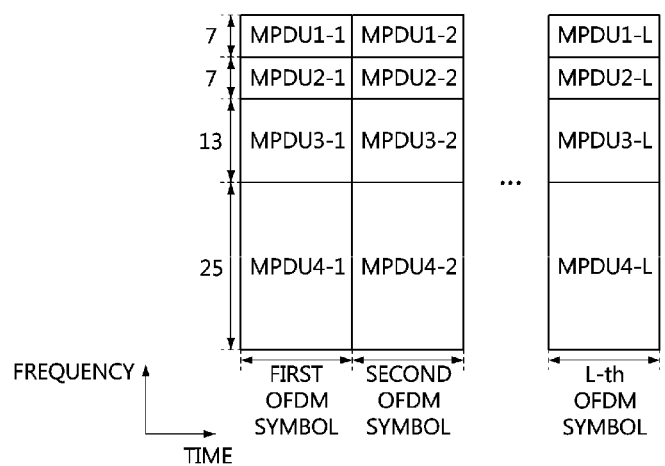
FIG. 10 is a conceptual diagram to explain a concept that a bit stream transmitted from a PHY processing unit to a scrambler is mapped to an OFDM symbol.

FIG. 10 is a conceptual diagram to explain a concept that a bit stream transmitted from a PHY processing unit to a scrambler is mapped to an OFDM symbol.

Referring to FIG. 10, when the numbers of frequency tones are 7:7:13:25, each of MPDUs may occupy 7, 7, 13, and 25 frequency tones in an OFDM symbol of the payload. Here, MPDU1-1 may mean a part of MPDU1 which is mapped to a first OFDM symbol, and MPDU2-1 may mean a part of MPDU2 which is mapped to the first OFDM symbol, and MPDU3-1 may mean a part of MPDU3 which is mapped to the first OFDM symbol, and MPDU4-1 may mean a part of MPDU4 which is mapped to the first OFDM symbol.

When an OFDM symbol has 52 frequency tones, in the first OFDM symbol, MPDU1-1 may occupy 7 frequency tones, and MPDU2-1 may occupy 7 frequency tones, and MPDU3-1 may occupy 13 frequency tones, and MPDU4-1 may occupy 25 frequency tones. Also in a second OFDM symbol to an L-th OFDM symbol, each of the plurality of MPDUs may occupy respective frequency tones in the manner which is similar to the case of the first OFDM symbol. Here, L is an integer value equal to or larger than 2.

On the other hand, bits transmitted through 52 frequency tones may be represented as 52×M. Here, M is an integer value. Thus, for each OFDM symbol, MPDU1 having a size of 7×M bits, MPDU2 having a size of 7×M bits, MPDU3 having a size of 13×M bits, and MPDU4 having a size of 25×M bits may be transmitted. Here, M may be determined according to a selected MCS value. For example, when BPSK is selected as a modulation scheme and R=½ is selected as a coding rate, M is determined to be ½. When 64-QAM is selected as a modulation scheme and R=⅔ is selected as a coding rate, M is determined to be 4.

Although an example in which the number of frequency tones for a single OFDM symbol is presumed to be 52 was explained, the number of frequency tones for a single OFDM symbol is not limited to the above example. For example, the number of frequency tones for a single OFDM symbol may be smaller or larger than 52.

Re-referring to FIG. 4 and FIG. 5, scrambling and encoding may be performed on the bit stream (S420).

The scrambler 209 may perform scrambling on the bit stream received from the PHY processing unit 208, and then transmit the scrambled bit stream to the encoder 210. The encoder 210 may perform encoding on the scrambled bit stream received from the scrambler 209. At this time, the encoder 210 may perform encoding such as a BCC encoding or a LDPC encoding. In addition, the bit stream on which the encoding has been performed may be punctured as necessary.

After the encoding (or, the puncturing), a stream parsing on the bit stream may be performed. That is, through the stream parsing, the bit stream may be rearranged into bit streams the number of which is identical to the number of spatial streams.

After the stream parsing, the interleaver 211 may perform interleaving on the bit stream, and transmit the interleaved bit stream the constellation mapper 212. Here, the interleaving may be performed by a BCC interleaver.

As the next step, complex symbol stream may be generated through constellation mapping on the bit stream (S430). The constellation mapper 212 may perform constellation mapping on the interleaved bit stream received from the interleaver 211 so as to generate a complex symbol stream. Here, the constellation mapper 212 may perform the constellation mapping based on BPSK, QPSK, 16 QAM, 64 QAM, 256 QAM, and so on.

After the constellation mapping, a PHY frame including a payload may be generated based on the complex symbol stream in the manner which will be described below, and be transmitted (S440).

That is, after the constellation mapping, pilots may be inserted into frequency tones, and an OFDM symbol may be generated by performing IDFT in the IDFT performing unit 213. Here, instead of IDFT, IFFT may be performed. After generation of the OFDM symbol, the GI insertion and windowing unit 214 may insert a GI into the OFDM symbol, and perform windowing on the OFDM symbol for smooth transition between adjacent OFDM symbols. Then, the GI insertion and windowing unit 214 may transmit the processed OFDM symbol to the analog and RF unit 215. The analog and RF unit 215 may convert the OFDM symbol which is a baseband signal into an analog signal, and transmit the converted analog signal in radio frequency.

Figure 11:
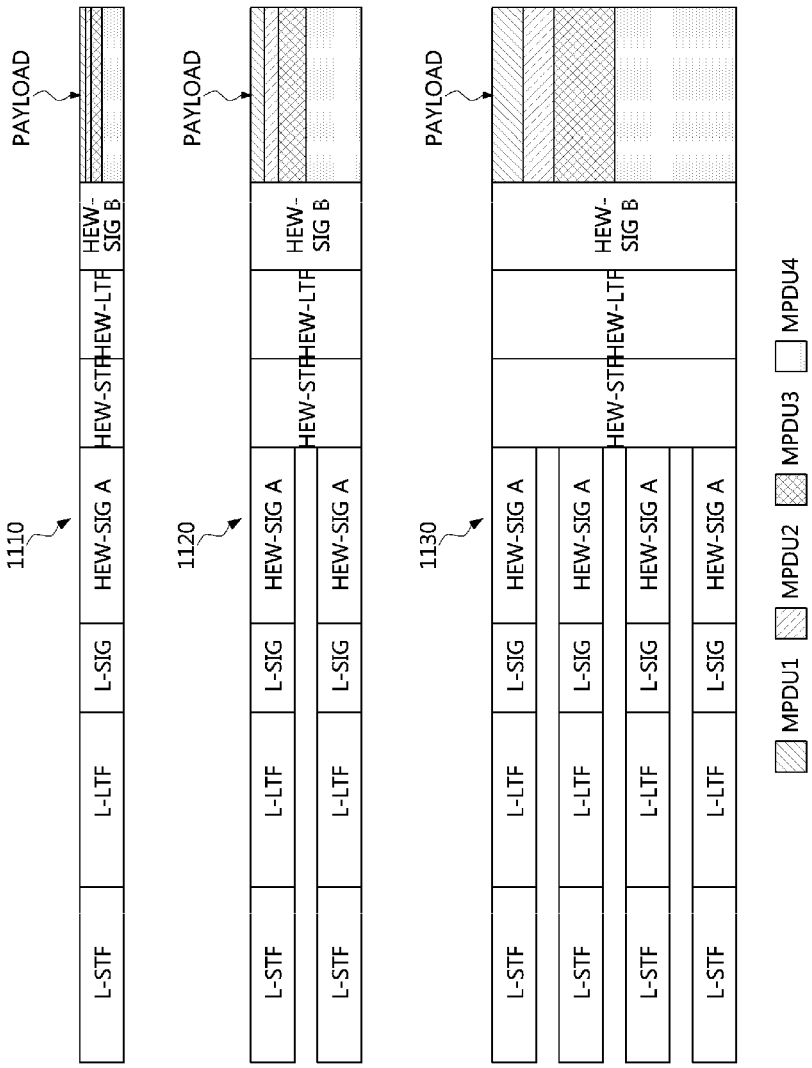
FIG. 11 is a block diagram illustrating a frame structure for each bandwidth which is generated according to an example embodiment of the present invention.

FIG. 11 is a block diagram illustrating a frame structure for each bandwidth which is generated according to an example embodiment of the present invention. Here, 20 MHz/40 MHz/80 MHz frames 1110, 1120, and 1130 illustrated in FIG. 11 may mean frames defined for a WLAN system according to IEEE 802.11ax standard.

Referring to FIG. 11, in the 20 MHz/40 MHz/80 MHz frames 1110, 1120, and 1130, a L-STF field, a L-LTF field, a L-SIG field, and a High Efficiency WLAN (HEW)-SIG A filed may be repeated in unit of 20 MHz for compatibility with legacy devices. Also, in the 20 MHz/40 MHz/80 MHz frames 1110, 1120, and 1130, a HEW-STF field, a HEW-LTF field, a HEW-SIG B filed, and a payload may be transmitted by maximizing frequency tones in use through channel bonding.

The L-SIG field may include information which is identical to information included in a conventional L-SIG field defined in IEEE 802.11 n/ac standards for legacy compatibility. That is, the L-SIG field may include information representing a length of the frame. Thus, a station which receives the frame may identify the length of the frame based on the information included in the L-SIG field.

The HEW-SIG A field may include a symbol modulated in BPSK and a symbol modulated in QBPSK for auto-detection. For reference, a HT-SIG A field included in a frame according to IEEE 802.11n standard may include a symbol modulated in QBPSK and a symbol modulated in QBPSK for auto-detection. Also, a VHT-SIG A field included in a frame according to IEEE 802.11ac standard may include a symbol modulated in QBPSK and a symbol modulated in BPSK for auto-detection.

Also, the HEW-SIG A field may use 48 frequency tones for each 20 MHz, for legacy compatibility. That is, in the 40 MHz frame, the HEW SIG A field may be repeated twice in unit of 20 MHz. Similarly, in the 80 MHz frame, the HEW SIG A field may be repeated four times in unit of 20 MHz.

The HEW-STF field may be used in order to perform automatic gain control (AGC) for beamforming transmission. That is, the HEW-STF is identical to a HT-STF included in a frame according to IEEE 802.11n standard or a VHT-STF included in a frame according to IEEE 802.11ac. The HEW-LTF may be used for estimating channels bonded through channel bonding. That is, the HEW-LTF may be identical to a HT-LTF included in a frame according to IEEE 802.11n standard or a VHT-LTF included in a frame according to IEEE 802.11ac.

On the other hand, at least one of the HEW-SIG A field and the HEW-SIG B field may include MPDU-related information. The MPDU-related information may include at least one of frequency bandwidth information, MCS information, information on occupied proportion of data (i.e. MPDUs) in a payload, identifiers (e.g. AID, PAID, group ID, etc.) of stations which will receive MPDUs included in the payload, and so on.

Also, when some of the MPDU-related information is included in the HEW-SIG A field, the HEW-SIG B field may include the rest of the MPDU-related information except the information included in the HEW-SIG A field. For example, if the identifiers (e.g. AID, PADI, group ID, etc.) of the stations which will receive MPDUs included in the payload are included in the HEW-SIG A field, the HEW-SIG B field may include at least one of the frequency bandwidth information, the MCS information, and the information on occupied proportion of data (i.e. MPDUs) in the payload.

In the payload, a plurality of MPDUs (e.g. MPDU1, MPDU2, MPDU3, and MPDU4) may be included. Each of the plurality of MPDUs may occupy respective frequency tones on the basis of the information on occupied proportion of data. In case that interleaving is performed, the plurality of MPDUs are evenly distributed over whole frequency band, and diversity effect may be obtained through the interleaving.

Figure 12:
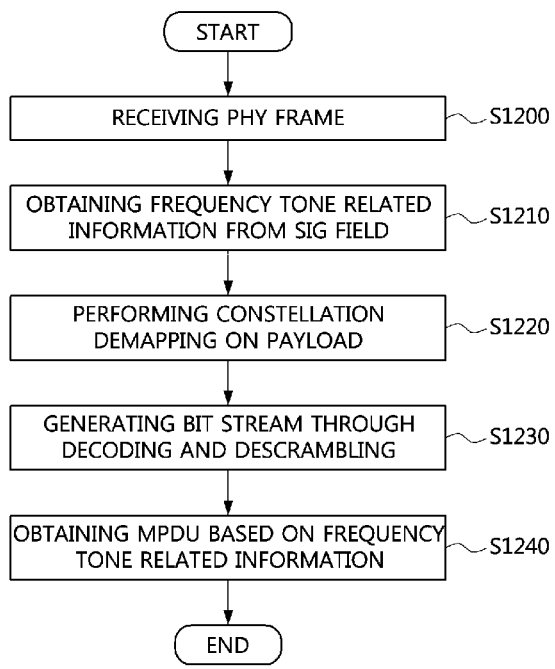
FIG. 12 is a flow chart illustrating a data multiplexing based OFDMA receiving method according to another example embodiment of the present invention.

FIG. 12 is a flow chart illustrating a data multiplexing based OFDMA receiving method according to another example embodiment of the present invention, and FIG. 13 is a block diagram illustrating a receiving end of a station performing the data multiplexing based OFDMA receiving method according to another example embodiment of the present invention.

Referring to FIG. 12 and FIG. 13, the analog and RF unit 215 may receive a PHY frame (S1200). The analog and RF unit 215 may perform RF processing on the received PHY frame, and convert analog signal into digital baseband signal through analog digital converter (ADC). Here, the analog and RF unit 215 may mean the RF receiver 122 illustrated in FIG. 1.

In the next step, signal processing on the PHY frame may be performed in a digital front end (DFE) 216, a discrete Fourier transform (DFT) performing unit 217, a channel estimator 218, a constellation demapper 219, a deinterleaver 220, a decoder 221, a descrambler 222, and a DEMUX 223. Here, the TX signal processing unit 112-2 illustrated in FIG. 1 may comprise the DFE 216, the DFT performing unit 217, the channel estimator 218, the constellation demapper 219, the deinterleaver 220, the decoder 221, the descrambler 222, the DEMUX 223, etc. In the PHY layer, the signal processing in a reception side may be performed in inverse order to the order in a transmission side explained by referring to FIG. 4 and FIG. 5. The signal processing may be performed based on preambles of the PHY frame and information included in the SIG fields of the PHY frame. Thus, the receiving end of the station may obtain information necessary for signal processing on the PHY frame from the SIG fields of the PHY frame (S1210).

For example, the receiving end of station may obtain frequency tone related information from the SIG A field and/or the SIG B field. The frequency tone related information may include at least one of frequency bandwidth information, MCS information, information on the numbers or proportions of frequency tones occupied by respective MPDUs in OFDM symbols in the payload, and identifiers (e.g. AID, PAID, group ID) of stations which will receive the MPDUs included in the payload, etc. Here, the frequency tone related information may be the same with the frequency tone related information explained by referring to FIG. 2 through FIG. 4. The receiving end of station may identify which frequency tones are used for MPDUs designated for it, on the basis of the frequency tone related information obtained from the SIG A field and/or the SIG B field.

The DFE 216 may include components necessary for signal processing. For example, the DFE 216 may include an AGC, filters, a digital amplifier, a direct current (DC) canceller, an in-phase/quadrature-phase (I/Q) compensation unit, a carrier frequency offset (CFO) compensation unit, etc. Each of the components included in the DFE 216 may perform signal processing on the PHY frame received from the analog and RF unit 215, and transmit the processed PHY frame to the DFT performing unit 217.

In the DFT 217, DFT may be performed on the PHY frame (i.e. on the payload included in the PHY frame). Also, instead of DFT, FFT may be performed on the PHY frame. Also, the PHY frame on which DFT has been performed may be transmitted to the channel estimator 218.

The channel estimator 218 may estimate channels based on pilots included in the PHY frame. After completion of the channel estimation, the channel estimator 218 may transmit the PHY frame to the constellation demapper 219.

In the next step, constellation demapping on the payload of the PHY frame may be performed (S1220). The constellation demapper 219 may perform the constellation demapping on the payload of the PHY frame based on MCS information (i.e. modulation scheme information) obtained from the SIG field (i.e. the SIG A field or the SIG B field) of the PHY frame, so as to generate a bit stream for the payload.

If interleaving has been performed in the transmission end of the station, the bit stream on which the constellation demapping is performed may be transmitted to the deinterleaver 220. The deinterleaver 220 may perform deinterleaving on the bit stream, and transmit the bit stream on which the deinterleaving is performed to the decoder 221. Also, if puncturing has been performed in the transmission end of the station, depuncturing on the bit stream may be performed.

As the next step, decoding and descrambling on the bit stream on which the constellation demapping (or, deinterleaving) has been performed may be performed (S1230).

The decoder 221 may perform the decoding on the bit stream based on MCS information (i.e. information on coding scheme information and coding rate) obtained from the SIG field (e.g. the SIG A field or the SIG B field) of the PHY frame. Here, the decoder 221 may perform BCC decoding or LDPC decoding. The decoder 221 may transmit the bit stream on which the decoding is performed to the descrambler 222.

The descrambler 222 may perform the descrambling on the bit stream based on a scrambler seed obtained from the service field. The descrambler 222 may transmit the bit stream on which the descrambling is performed to the DEMUX 223.

As the next step, at least one MPDU may be obtained from the bit stream on which the decoding and the descrambling have been performed (S1240).

The DEMUX 223 may perform serial-to-parallel conversion on the bit stream in unit of OFDM symbol based on the frequency bandwidth information, the MCS information, and the occupied proportion information for data (or, MPDUs) obtained from the SIG field of the PHY frame. The DEMUX 223 may obtain a plurality of MPDUs from the bit stream on which the serial-to-parallel conversion has been performed, and transmit each of the obtained MPDUs to the corresponding FIFO 205-1, 205-2, 205-3, and 205-4.

In the following descriptions, a procedure for obtaining MPDUs from the bit stream will be explained in detail by referring to FIG. 10.

In the case 1 which has been explained, MPDU1-1, MPDU1-2, . . . , and MPDU1-L may mean MPDUs which belong to AC_VO (AC1) and will be transmitted to the first station (STA1), and MPDU2-1, MPDU2-2, . . . , and MPDU2-L may mean MPDUs which belong to AC_VI (AC2) and will be transmitted to the first station (STA1), and MPDU3-1, MPDU3-2, . . . , and MPDU3-L may mean MPDUs which belong to AC_BE (AC3) and will be transmitted to the first station (STA1), and MPDU4-1, MPDU4-2, . . . , and MPDU4-L may mean MPDUs which belong to AC_BK (AC4) and will be transmitted to the first station (STA1).

Therefore, the DEMUX 223 may obtain 7×M bits from a start point of each OFDM symbol, and transmit them (i.e. MPDU1-1, MPDU1-2, . . . , and MPDU1-L) to FIFO1 205-1. Then, the DEMUX 223 may obtain the next 7×M bits of each OFDM symbol, and transmit them (i.e. MPDU2-1, MPDU2-2, . . . , and MPDU2-L) to FIFO2 205-2. Then, the DEMUX 223 may obtain the next 13×M bits of each OFDM symbol, and transmit them (i.e. MPDU3-1, MPDU3-2, . . . , and MPDU3-L) to FIFO3 205-3. Then, the DEMUX 223 may obtain the next 25×M bits of each OFDM symbol, and transmit them (i.e. MPDU4-1, MPDU4-2, and MPDU4-L) to FIFO4 205-4.

In the case 2 which has been explained, MPDU1-1, MPDU1-2, . . . , and MPDU1-L may mean MPDUs which belong to AC_VO (AC1) and will be transmitted to the first station (STA1), and MPDU2-1, MPDU2-2, . . . , and MPDU2-L may mean MPDUs which belong to AC_VO (AC1) and will be transmitted to the second station (STA2), and MPDU3-1, MPDU3-2, . . . , and MPDU3-L may mean MPDUs which belong to AC_VO (AC1) and will be transmitted to the third station (STA3), and MPDU4-1, MPDU4-2, . . . , and MPDU4-L may mean MPDUs which belong to AC_VO (AC1) and will be transmitted to the fourth station (STA4).

Therefore, the DEMUX 223 may obtain 7×M bits from a start point of each OFDM symbol, and transmit them (i.e. MPDU1-1, MPDU1-2, . . . , and MPDU1-L) to FIFO1 205-1. Then, the DEMUX 223 may obtain the next 7×M bits of each OFDM symbol, and transmit them (i.e. MPDU2-1, MPDU2-2, . . . , and MPDU2-L) to FIFO1 205-1. Then, the DEMUX 223 may obtain the next 13×M bits of each OFDM symbol, and transmit them (i.e. MPDU3-1, MPDU3-2, . . . , and MPDU3-L) to FIFO1 205-1. Then, the DEMUX 223 may obtain the next 25×M bits of each OFDM symbol, and transmit them (i.e. MPDU4-1, MPDU4-2, and MPDU4-L) to FIFO1 205-1.

In the case 3 which has been explained, MPDU1-1, MPDU1-2, . . . , and MPDU1-L may mean MPDUs which belong to AC_VO (AC1) and will be transmitted to the first station (STA1), and MPDU2-1, MPDU2-2, . . . , and MPDU2-L may mean MPDUs which belong to AC_VI (AC2) and will be transmitted to the first station (STA1), and MPDU3-1, MPDU3-2, . . . , and MPDU3-L may mean MPDUs which belong to AC_BE (AC3) and will be transmitted to the second station (STA2), and MPDU4-1, MPDU4-2, . . . , and MPDU4-L may mean MPDUs which belong to AC_BK (AC4) and will be transmitted to the second station (STA2).

Therefore, the DEMUX 223 may obtain 7×M bits from a start point of each OFDM symbol, and transmit them (i.e. MPDU1-1, MPDU1-2, . . . , and MPDU1-L) to FIFO1 205-1. Then, the DEMUX 223 may obtain the next 7×M bits of each OFDM symbol, and transmit them (i.e. MPDU2-1, MPDU2-2, . . . , and MPDU2-L) to FIFO2 205-2. Then, the DEMUX 223 may obtain the next 13×M bits of each OFDM symbol, and transmit them (i.e. MPDU3-1, MPDU3-2, . . . , and MPDU3-L) to FIFO3 205-3. Then, the DEMUX 223 may obtain the next 25×M bits of each OFDM symbol, and transmit them (i.e. MPDU4-1, MPDU4-2, . . . , and MPDU4-L) to FIFO4 205-4.

Re-referring to FIG. 12 and FIG. 13, each of the plurality of FIFOs 205-1, 205-2, 205-3, and 205-4 may transmit at least one MPDU received from the DEMUX 223 to the MAC hardware 204. The MAC hardware 204 may transmit at least one MPDU whose destination is set to itself among the plurality of MPDUs received from the plurality of FIFOs 205-1, 205-2, 205-3, and 205-4 to the host 200 in MSDU form. At this time, the MAC hardware 204 may identify which MPDU's destination is set to itself, on the basis of a station identifier or a destination address included in a MAC header of each MPDU obtained from a SIG field (e.g. the SIG A field or the SIG B field) of the PHY frame.

In the following descriptions, a method and an apparatus for transmitting and receiving acknowledgement (ACK) frames which are responses to a plurality of data belonging to different ACs will be explained. A station may operate based on a power save multi-poll (PSMP) protocol. For example, when the station operating based on the PSMP protocol receives a PPDU (PLCP protocol data unit) comprising a plurality of MPDUs belonging to different ACs and having the same destination, it may transmit an ACK frame for the plurality of MPDUs included in the PPDU.

Here, the ACK frame may be transmitted according to an ACK policy defined in the following table 5.

TABLE 5

| ACK policy field value | Non A-MPDU or VHT single A-MPDU | A-MPDU |
|---|---|---|
| 0 | Normal ACK | Implicit BA |
| 1 | No Explicit ACK or PSMP ACK | |
| 2 | No ACK | |
| 3 | — | Explicit BA |

In this specification, "A-MPDU" may mean A-MPDU comprising a plurality of MPDUs, and "VHT single A-MPDU" may mean A-MPDU comprising a single MPDU. Also, "Normal ACK" may mean transmission of an ACK frame, and "No explicit ACK" may mean transmission of a response frame not an ACK frame, and "No ACK" may mean no transmission of an ACK frame. "Implicit BA" may mean transmission of a BA frame without reception of a block ACK request (BAR) frame, and "Explicit BA" may mean transmission of a BA frame after receiving a BAR frame. "PSMP ACK" may mean transmission of an ACK frame (e.g. multi-TID BA frame) according to the PSMP protocol.

Like this, the ACK frame or the BA frame is a response to at least one MPDU belonging to a single AC (i.e. TID). However, in the PSMP protocol, although "Explicit BA" or "PSMP ACK" can be performed for responding to a plurality of MPDUs belonging to different ACs, "Normal ACK" and "Implicit BA" cannot be performed. That is, there is a restriction on ACK procedures which can be used for responding to a plurality of MPDUs belonging to different ACs.

In the following descriptions, an ACK procedure for a PPDU comprising a plurality of MPDUs (or, A-MPDU) belonging to different ACs will be explained. An ACK procedure for a PPDU comprising at least one MPDU (or, A-MPDU) belonging to the same AC and an ACK procedure for a PPDU comprising a plurality of MPDUs (or, A-MPDU) belonging to different ACs are represented as shown in the following table 6. Here, the ACK procedure for a PPDU comprising at least one MPDU (or, A-MPDU) belonging to the same AC may be identical to the ACK procedure shown in the table 5.

TABLE 6

| ACK policy Field value | At least one MPDU (or, A-MPDU) belonging to the same AC | | MPDUs (or, A-MPDU) belonging to different ACs | |
| --- | --- | --- | --- | --- |
| | Non A-MPDU or VHT single A-MPDU | A-MPDU | VHT single A-MPDU | A-MPDU |
| 0 | Normal ACK | Implicit BA | Normal ACK | Implicit BA |
| 1 | No Explicit ACK or PSMP ACK | | No Use | |
| 2 | No ACK | | No ACK | |
| 3 | — | Explicit BA | — | Explicit BA |

In the ACK procedure for a PPDU comprising MPDUs (or, A-MPDU) belonging to different ACs, "Normal ACK" may mean transmission of a multi-TID ACK frame, and "Implicit BA" may mean transmission of a multi-TID BA frame without reception of a BAR frame, and "Explicit BA" may mean transmission of a multi-TID BA frame after reception of a BAR frame. Here, the multi-TID ACK frame and the multi-TID BA frame will be explained later in detail. A method for transmitting and receiving data based on the ACK policy defined in the table 6 is as follows.

FIG. 14 is a sequence chart illustrating a method for transmitting and receiving data according to an example embodiment of the present invention.

Referring to FIG. 14, each of stations STA1, STA2 may mean the access point or the terminal. The second station STA2 may generate the PPDU including the plurality of MPDUs (or, A-MPDUs, VHT single A-MPDUs) which belong to different ACs and have a destination address of the first station STA1. Here, the PPDU may be generated based on the above described method referring to FIG. 4.

Next, the method for transmitting and receiving data will be described when the plurality of VHT single A-MPDUs included in the PPDU belong to different ACs and the ACK policy field of each of the plurality of VHT single A-MPDUs is set to "0."

The second station STA2 may generate a VHT single A-MPDU1 and a VHT single A-MPDU2 for each of a plurality of data when the plurality of data which belong to different ACs and have the destination address of the first station STA1 exist. Here, the VHT single A-MPDU1 may include TID1 when the VHT single A-MPDU1 belongs to an AC1 mapped to TID1. The VHT single A-MPDU2 may include TID2 when the VHT single A-MPDU2 belongs to an AC2 mapped to TID2.

Also, the second station STA2 may set the ACK policy field included in the MAC header of each of the VHT single A-MPDU1 and the VHT single A-MPDU2 to "0." Then, the second station STA2 may generate the PPDU including the VHT single A-MPDU1, the VHT single A-MPDU2, and so on, and may transmit the generated PPDU to the first station STA1 (S1400).

The first station STA1 may perform the ACK procedure with the second station STA2 when the PPDU is successfully received (S1410). That is, the first station STA1 may identify the ACK policy field included in the MAC header of each of the VHT single A-MPDU1 and the VHT single A-MPDU2 included in the PPDU to be set to "0." Therefore, the first station STA1 may generate the multi-TID ACK frame in response to the VHT single A-MPDU1 and the VHT single A-MPDU2 based on the ACK policy defined in the table 6. Here, the multi-TID ACK frame may mean an ACK frame which further includes identifier corresponding to the VHT single A-MPDU as follows. The identifier may mean information on AC of the VHT single A-MPDU such as TID.

Figure 15:
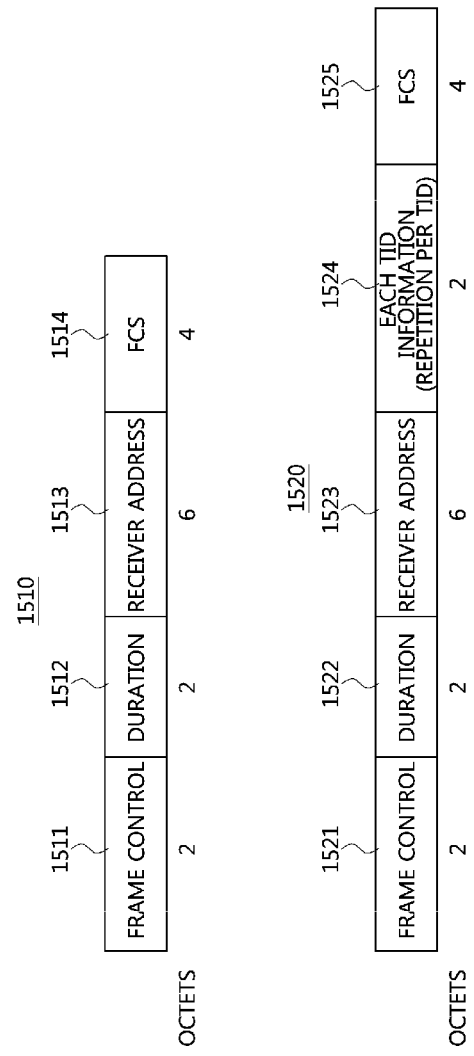
FIG. 15 is a block diagram illustrating an ACK frame and a multi-TID ACK frame.

FIG. 15 is a block diagram illustrating an ACK frame and a multi-TID ACK frame.

Referring to FIG. 15, the ACK frame 1510 may include a frame control field 1511 having a size of 2 octets, a duration field 1512 having a size of 2 octets, a receiver address (RA) field 1513 having a size of 6 octets, and a frame check sequence (FCS) field 1514 having a size of 4 octets. The multi-TID ACK frame 1520 may have a form in which at least one TID information field 1524 is added to the ACK frame 1510.

Each TID information field 1524 may include TID for the VHT single A-MPDU included in the received PPDU. Here, the number of TID information fields 1524 included in the multi-TID ACK frame 1520 is identical to the number of the VHT single A-MPDUs included in the PPDU corresponding to current multi-TID ACK frame 1520. For example, when three VHT single A-MPDUs belonging to different ACs are included in the PPDU, the multi-TID ACK frame 1520 in response to the PPDU may include three TID information fields 1524 each of which corresponds to each of three VHT single A-MPDUs.

Also, only TID for successfully received VHT single A-MPDU among the plurality of VHT single A-MPDUs included in the PPDU may be transmitted on the multi-TID ACK frame 1520. For example, when only two VHT single A-MPDUs are successfully received among three VHT single A-MPDUs included in the PPDU, the multi-TID ACK frame 1520 including the TIDs for successfully-received two VHT single A-MPDUs may be transmitted.

Re-referring to FIG. 14, the multi-TID ACK frame in response to the PPDU may include a first TID information field in which TID1 for the VHT single A-MPDU1 is set and a second TID information field in which TID2 for the VHT single A-MPDU2 is set. The first station STA1 may transmit the multi-TID ACK frame in response to the PPDU to the second station STA after the SIFS from the reception end time of the PPDU.

The second station STA2 may receive the multi-TID ACK frame transmitted from the first station STA1. When the TID1 for the VHT single A-MPDU1 and the TID2 for the VHT single A-MPDU2 are set in respective TID information fields included in the received multi-TID ACK frame, the second station STA2 may identify that the PPDU is successfully received at the first station STA1.

Meanwhile, when the multi-TID ACK frame in response to the PPDU is not received from the first station STA1 after the SIFS from the transmission end time of the PPDU, the second station STA2 may identify that the PPDU is not successfully received at the first station STA1. Then, the second station STA2 may retransmit the PPDU to the first station STA1 through a retransmission procedure.

Also, when the second station STA2 receives the multi-TID ACK frame from the first station STA1 in response to the PPDU, if the multi-TID ACK frame includes TIDs for only some VHT single A-MPDUs instead of TIDs for all VHT single A-MPDUs included in the PPDU, the second station STA2 may identify that the VHT single A-MPDU having the TID which is not included in the multi-TID ACK frame is not successfully received at the first station STA1. In this case, the second station STA2 may retransmit the VHT single A-MPDU which is not successfully received at the first station STA1 to the first station STA1 through the retransmission procedure.

Next, the method for transmitting and receiving data will be described when the plurality of VHT single A-MPDUs (or, the plurality of A-MPDUs) included in the PPDU belong to different ACs and the ACK policy field of each of the plurality of VHT single A-MPDUs (or the plurality of A-MPDUs) is set to "2."

The second station STA2 may generate the VHT single A-MPDU1 (or, A-MPDU1) and the VHT single A-MPDU2 (or, A-MPDU2) for each of the plurality of data when the plurality of data which belong to different ACs and have the destination address of the first station STA1 exist. Here, the VHT single A-MPDU1 (or A-MPDU1) may include TID1 when the VHT single A-MPDU1 (or A-MPDU1) belongs to the AC1 mapped to TID1. The VHT single A-MPDU2 (or A-MPDU2) may include TID2 when the VHT single A-MPDU2 (or A-MPDU2) belongs to the AC2 mapped to TID2.

Also, the second station STA2 may set the ACK policy field included in the MAC header of each of the VHT single A-MPDU1 (or A-MPDU1) and the VHT single A-MPDU2 (or A-MPDU2) to "2." Then, the second station STA2 may generate the PPDU including the VHT single A-MPDU1 (or A-MPDU1), the VHT single A-MPDU2 (or A-MPDU2), etc., and may transmit the generated PPDU to the first station STA1 (S1400).

The first station STA1 may perform the ACK procedure with the second station STA2 when the PPDU is successfully received (S1410). That is, the first station STA1 may identify that the ACK policy field included in the MAC header of each of the VHT single A-MPDU1 (or A-MPDU1) and the VHT single A-MPDU2 (or A-MPDU2) included in the PPDU is set to "2." Therefore, the first station STA1 may not transmit the ACK frame in response to the VHT single A-MPDU1 (or A-MPDU1) and the VHT single A-MPDU2 (or A-MPDU2) to the second station STA2 based on the ACK policy defined in the table 6.

Next, the method for transmitting and receiving data will be described when the plurality of A-MPDUs included in the PPDU belong to different ACs and the ACK policy field of each of the plurality of A-MPDUs is set to "0."

The second station STA2 may generate the A-MPDU1 and the A-MPDU2 for each of the plurality of data when the plurality of data which belong to different ACs and have the destination address of the first station STA1 exist. Here, the A-MPDU1 may include TID1 when the A-MPDU1 belongs to AC1 mapped to TID1. The A-MPDU2 may include TID2 when the A-MPDU2 belongs to AC2 mapped to TID2.

Also, the second station STA2 may set the ACK policy field included in the MAC header of each of the A-MPDU1 and the A-MPDU2 to "0." Then, the second station STA2 may generate the PPDU including the A-MPDU1, the A-MPDU2, etc., and may transmit the generated PPDU to the first station STA1 (S1400).

The first station STA1 may perform the ACK procedure with the second station STA2 when the PPDU is successfully received (S1410). That is, the first station STA1 may identify that the ACK policy field included in the MAC header of each of the A-MPDU1 and the A-MPDU2 included in the PPDU is set to "0." Therefore, the first station STA1 may generate a multi-TID BA frame in response to the A-MPDU1 and the A-MPDU2 based on the ACK policy defined in the table 6. Here, the multi-TID BA frame may be constructed as follows.

Figure 16:
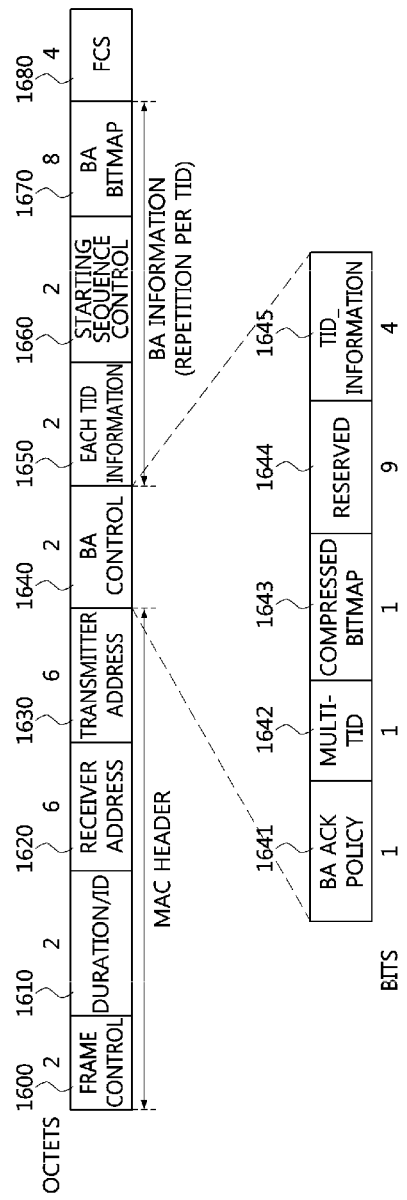
FIG. 16 is a block diagram illustrating a multi-TID block BA frame.

FIG. 16 is a block diagram illustrating a multi-TID block BA frame.

Referring to FIG. 16, the multi-TID BA frame may include a MAC header, a BA control field 1640, a BA information field, and a FCS field 1680. The MAC header may include a frame control field 1600 having a size of 2 octets, a duration/ID field 1610 having a size of 2 octets, a receiver address field 1620 having a size of 6 octets, and a transmitter address (TA) field 1630 having a size of 6 octets.

The BA control field 1640 may include a BA ACK policy field 1641 having a size of 1 bit, a multi-TID field 1642 having a size of 1 bit, a compressed bitmap field 1643 having a size of 1 bit, a reserved field 1644 having a size of 9 bits, and a TID information (TID_INFO) field 1645 having a size of 4 bits.

The BA ACK policy field 1641 may indicate a BA ACK policy. For example, when the bit in the BA ACK policy field 1641 is set to "0," this case may indicate that the BA ACK policy is "implicit BA." When the bit in the BA ACK policy field 1641 is set to "2," this case may indicate that the BA ACK policy is "No ACK."

The multi-TID field 1642 and the compressed bitmap field 1643 may indicate a form of a current BA frame. That is, the multi-TID field 1642 and the compressed bitmap field 1643 may indicate that the current BA frame is a basic BA frame, a compressed BA frame, a reserved frame or the multi-TID BA frame as blow table 7.

TABLE 7

| Multi-TID field | Compressed bitmap field | Form of BA frame |
|---|---|---|
| 0 | 0 | Basic BA |
| 0 | 1 | Compressed BA |
| 1 | 0 | Reserved |
| 1 | 1 | Multi-TID BA |

The meaning of the TID_INFO field 1645 may be varied according to the form of the BA frame. When the form of the BA frame is the basic BA frame or the compressed BA frame, the TID_INFO field 1645 may include the TID. When the form of the BA frame is the multi-TID BA frame, the TID_INFO field 1645 may indicate the number of TIDs included in the BA information field. For example, when the value of the TID_INFO field 1645 is set to 2, the TID_INFO field 1645 may indicate that three TIDs exist in the BA information field.

The BA information field may include a TID information (per TID_INFO) field 1650 having a size of 2 octets, a starting sequence control field 1660 having a size of 2 octets, and a BA bitmap field 1670 having a size of 8 octets. The respective fields included in the BA information field may be repeated per the TID. For example, when the BA information field indicates the reception success or failure of the MPDUs or the A-MPDUs corresponding to TID1 and the reception success or failure of the MPDUs or the A-MPDUs corresponding to TID2, the BA information field may include fields for TID1 such as a TID information field for TID1, a starting sequence control field for TID1, and a BA bitmap field for TID1, and fields for TID2 such as a TID information field for TID2, a starting sequence control field for TID2, and a BA bitmap field for TID2.

The TID information field 1650 may indicate the corresponding TID. The starting sequence control field 1660 may indicate the sequence number of first MPDU or first A-MPDU among the MPDUs or the A-MPDUs which are identified as the reception success or failure through the current BA bitmap field 1670. When an arbitrary bit included in the BA bitmap field 1670 is set to "1," this case may indicate that the MPDU or the A-MPDU corresponding to the arbitrary bit is successfully received. On the other hand, when the arbitrary bit included in the BA bitmap field 1670 is set to "0," this case may indicate that the MPDU or the A-MPDU corresponding to the arbitrary bit is not successfully received.

The multi-TID BA frame may include the BA information field1 for the A-MPDU1 and the BA information field2 for the A-MPDU2. The each of the BA information field1 and the BA information field2 may include the TID information field, the sequence control field, and the BA bitmap field for the A-MPDU1 and the A-MPDU2, respectively.

Next, re-referring to FIG. 14, the first station STA1 may transmit the multi-TID BA frame in response to the PPDU to the second station STA2 after the reception end time of the PPDU. The second station STA2 may receive the multi-TID BA frame transmitted from the first station STA1. The second station STA2 may identify the reception success or failure of each of the plurality of MPDUs included in the A-MPDU1 and the A-MPDU2 based on the value set in the BA bitmap field included in the BA information field1 for the A-MPDU1 and the BA information field2 for the A-MPDU2 in the multi-TID BA frame.

Meanwhile, when the plurality of A-MPDUs included in the PPDU belong to different ACs and the ACK policy field of each of the plurality of A-MPDUs is set to "3," the ACK policy is "explicit BA." "Explicit BA" may be classified to an immediate BA and a delayed BA. Next, it will be described that methods for transmitting and receiving data based on the immediate BA and the delayed BA when the ACK policy is "explicit BA."

The second station STA2 may generate the A-MPDU1 and the A-MPDU2 for each of the plurality of data when the plurality of data which belong to different ACs and have the destination address of the first station STA1 exist. Here, the A-MPDU1 may include the TID1 when the A-MPDU1 belongs to the AC1 mapped to the TID1. The A-MPDU2 may include the TID2 when the A-MPDU2 belongs to the AC2 mapped to the TID2.

Also, the second station STA2 may set the ACK policy field included in the MAC header in each of the A-MPDU1 and the A-MPDU2 to "3." Then, the second station STA2 may generate the PPDU including the A-MPDU1, the A-MPDU2, etc., and may transmit the generated PPDU to the first station STA1 (S1400). Then, the ACK procedure between the first station STA1 and the second station STA2 may be performed (S1410).

That is, the second station STA2 may transmit the multi-TID block ACK request (BAR) frame to the first station STA1. In that case, the second station STA2 may transmit the multi-TID BAR frame to the first station STA1 after predefined time (e.g. SIFS) from the transmission end time of the PPDU. Here, the multi-TID BAR frame may consist of as follows.

Figure 17:
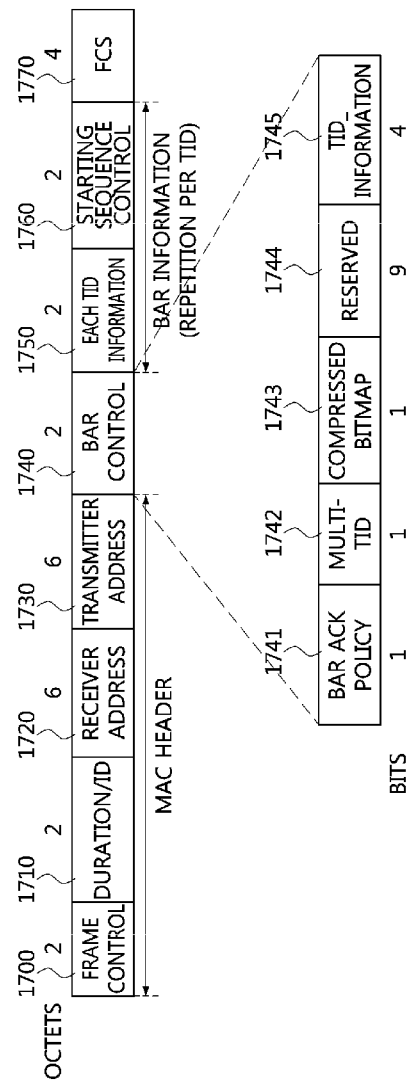
FIG. 17 is a block diagram illustrating a multi-TID BAR frame.

FIG. 17 is a block diagram illustrating a multi-TID BAR frame.

Referring to FIG. 17, the multi-TID BAR frame may mean a frame including fields included in the above described multi-TID BA frame referring to FIG. 16 except for the BA bitmap field 1670. The meaning of each field included in the multi-TID BAR frame may be identical to the meaning of each field included in the multi-TID BA frame.

The multi-TID BAR frame may include a MAC header, a BAR control field 1740, a BA information field, and a FCS field 1770. The BA control field 1740 may include a BAR ACK policy field 1741, a multi-TID field 1742, a compressed bitmap field 1743, a reserved field 1744, and a TID_INFO field 1745. The BAR ACK policy field 1741 may indicate the BAR ACK policy. The multi-TID field 1742 and the compressed bitmap field 1743 may indicate the form of the current BAR frame. That is, the multi-TID field 1742 and the compressed bitmap field 1743 may indicate that the current BAR frame is a basic BAR frame, a compressed BAR frame, a reserved frame, or the multi-TID BAR frame, as similar to the table 7.

The meaning of the TID_INFO field 1745 may be varied according to the form of the BAR frame. The BAR information field may include a TID information field 1750 and a starting sequence control field 1760. The respective fields included in the BAR information field may be repeated per TID.

Re-referring to FIG. 14, the BAR information field of the multi-TID BAR frame may include TID1 for A-MPDU1 and TID2 for A-MPDU2.

Meanwhile, when the PPDU is received, the first station STA1 may identify that the ACK policy is "explicit BA" through the MAC header included in each of the plurality of A-MPDUs included in the PPDU. When "explicit BA" is performed as the immediate BA manner, the first station STA1 may transmit the multi-TID BA frame in response to the PPDU to the second station STA2 after reception of the multi-TID BAR frame transmitted from the second station STA2.

In detail, when the PPDU is successfully received from the second station STA2, the first station STA1 may identify that the value of the ACK policy field included in the MAC header of each of the A-MPDU1 and the A-MPDU2 included in the PPDU is set to "3." Therefore, the first station STA1 may generate the multi-TID BA frame in response to A-MPDU1 and A-MPDU2 based on the ACK policy defined in the table 6.

Here, the multi-TID BA frame may include the BA information field1 for the A-MPDU1 and the BA information field2 for the A-MPDU2. Each of the BA information field1 and the BA information field2 may include a TID information field, a starting sequence control field, and a BA bitmap field for each of A-MPDU1 and A-MPDU2.

The first station STA1 may transmit the multi-TID BA frame in response to the PPDU after the SIFS from the reception end time of the multi-TID BAR frame. The second station STA2 may receive the multi-TID BA frame transmitted from the first station STA1. The second station STA2 may identify the reception success or failure of the plurality of MPDUs based on the value set in the BA bitmap field included in each of the BA information field1 and the BA information field2 in the multi-TID BA frame.

Meanwhile, when "explicit BA" is performed as the delayed BA manner, the first station STA1 may receive the multi-TID BAR frame from the second station STA2 and then may transmit the ACK frame in response to the multi-TID BAR frame after the reception end time of the multi-TID BAR frame.

Then, the first station STA1 may generate the multi-TID BA frame in response to A-MPDU1 and A-MPDU2 based on the ACK policy defined in the table 6, and may transmit the multi-TID BA frame in response to the PPDU to the second station STA2. The second station STA2 receiving the multi-TID BA frame may identify that the reception success or failure of the plurality of MPDUs included in each of A-MPDU1 and A-MPDU2 based on the value set in the BA bitmap field included in each of the BA information field1 and the BA information field2 in the multi-TID BA frame.

When the multi-TID BA frame is successfully received, the second station STA2 may transmit the ACK frame in response to the multi-TID BA frame to the first station STA1 after the SIFS from the reception end time of the multi-TID BA frame. When the ACK frame in response to the multi-TID BA frame is received from the second station STA2, the first station STA1 may identify that the multi-TID BA frame is successfully received at the second station STA2.

A case that the PPDU consisting of the plurality of A-MPDUs belonging to different ACs is transmitted to the one station is described above. When the PPDU consisting of the plurality of A-MPDUs which belong to different ACs and have different destination addresses is transmitted, the number of responses of each of the stations receiving the PPDU may be one or more. Also, the response form of the PPDU may be varied according to the number of MPDUs included in each of the plurality of A-MPDUs included in the PPDU. These are summarized as a below table 8. That is, the table 8 is identical to briefly summarized table 6.

TABLE 8

|  | PPDU consisting of the plurality of A-MPDUs belonging to same AC | | PPDU consisting of the plurality of A-MPDUs belonging to different ACs | |
| --- | --- | --- | --- | --- |
|  | A-MPDU including one MPDU | A-MPDU including the plurality of MPDUs | A-MPDU including one MPDU | A-MPDU including the plurality of MPDUs |
| Response manner | ACK frame | BA frame | Multi-TID ACK frame | Multi-TID BA frame |

When the PPDU consisting of the plurality of A-MPDUs which belong to different ACs and have different destination address is transmitted, the operation of each of the plurality of station is identical to as follows. Here, each of the plurality of stations may perform the ACK procedure based on the ACK policy defined in the tables 6 and 9.

FIG. 18 is a concept diagram illustrating a method for transmitting and receiving a PPDU consisting of a plurality of A-MPDUs which belong to different ACs and have different destination addresses.

Referring to FIG. 18, when a plurality of data which belong to different ACs and have the destination address of the second station STA2 exist, the first station STA1 may generate A-MPDU1 and A-MPDU2 for each of the plurality of data. Also, when data which belongs to an AC and has the destination address of the third station STA3 exist, the first station STA1 may generate A-MPDU3 for the data. Also, when a plurality of data which belong to different ACs and have the destination address of the fourth station STA4 exist, the first station STA1 may generate A-MPDU4 and A-MPDU5 for each of the plurality of data.

Here, A-MPDU1 may include TID1 when A-MPDU1 belongs to AC1 mapped to TID1, and A-MPDU2 may include TID2 when A-MPDU2 belongs to AC2 mapped to TID2, and A-MPDU3 may include TID1 when A-MPDU3 belongs to AC1 mapped to TID1, and A-MPDU4 may include TID2 when A-MPDU4 belongs to AC2 mapped to TID2, and A-MPDU5 may include TID3 when A-MPDU5 belongs to AC3 mapped to TID3.

Also, the first station STA1 may set the ACK policy field included in the MAC header of each of A-MPDU1 and A-MPDU2 to "0," and may set the ACK policy field included in the MAC header of each of A-MPDU3, A-MPDU4, and A-MPDU5 to "3."

Then, the first station STA1 may generate the PPDU 1800 consisting of A-MPDU1, A-MPDU2, A-MPDU3, A-MPDU4, A-MPDU5, etc., and may transmit the generated PPDU 1800 to the second station STA2, the third station STA3, the fourth station STA4 based in a multicast manner (or a broadcast manner).

When the PPDU 1800 is received, the second station STA2 may identify that the ACK policy is "implicit BA" through the MAC header included in each of A-MPDU1 and A-MPDU2 having the destination address of the second station STA2 among the plurality of the A-MPDUs included in the PPDU 1800. The second station STA2 may transmit the multi-TID BA frame 1810 in response to the PPDU 1800 to the first station STA1 after the SIFS from the reception end time of the PPDU 1800 transmitted from the first station STA1.

The first station STA1 may receive the multi-TID BA frame 1810 transmitted from the second station STA2. The first station STA1 may identify the reception success or failure of each of the plurality of MPDUs included in each of A-MPDU1 and A-MPDU2 based on the value set in the BA bitmap field included in each of the BA information field1 and the BA information field2 in the multi-TID BA frame 1810.

The first station STA1 may transmit the BAR frame (i.e. the basic BAR frame or the compressed BAR frame) 1820 to the third station STA3 after the SIFS from the reception end time of the multi-TID BA frame 1810. The basic BAR frame and the compressed BAR frame may be identical to the frame illustrated in FIG. 17 except for the each TID_INFO field.

Meanwhile, when the PPDU 1800 is received, the third station STA3 may identify that the ACK policy is "explicit BA" through the MAC header included in the A-MPDU3 having the destination address of the third station STA3 and the A-MPDU3 belongs to one AC. Therefore, the third station STA3 may transmit the BA frame (i.e. the basic BA frame or the compressed BA frame) 1830 in response to the PPDU 1800 after the SIFS from the reception end time of the BAR frame 1820 transmitted from the first station STA1.

Meanwhile, the first station STA1 may receive the BA frame 1830 transmitted from the third station STA3. The first station STA1 may identify the reception success or failure of the plurality of MPDUs included in the A-MPDU3 based on the value set in the BA bitmap field in the BA frame 1830.

The first station STA1 may transmit the multi-TID BAR frame 1840 to the fourth station STA4 after the SIFS from the reception end time of the BA frame 1830. When the PPDU 1800 is received, the fourth station STA4 may identify that the ACK policy is "explicit BA" through the MAC header included in each of A-MPDU4 and A-MPDU5 having the destination address of the fourth station STA4 among the plurality of A-MPDUs included in the PPDU 1800. Therefore, the fourth station STA4 may transmit the multi-TID BA frame 1850 in response to the PPDU 1800 to the first station STA1 after the SIFS from the reception end time of the multi-TID BAR frame 1840 transmitted from the first station STA1.

In detail, the fourth station STA4 may identify that the ACK policy field included in the MAC header of each of A-MPDU4 and A-MPDU5 included in the PPDU 1800 is set to "3." Therefore, the fourth station STA4 may generate the multi-TID BA frame 1850 in response to A-MPDU4 and A-MPDU5 based on the ACK policy defined in the table 6. Here, the multi-TID BA frame 1850 may be identical to the form of the above described frame referring to FIG. 16.

The first station STA1 may receive the multi-TID BA frame 1850 transmitted from the fourth station STA4. The first station STA1 may identify the reception success or failure of each of the plurality of MPDUs included in each of A-MPDU4 and A-MPDU5 based on the value set in the BA bitmap field included in each of the BA information field1 and the BA information field2 in the multi-TID BA frame 1850.

The example embodiments of the present invention may be implemented in the form of program instructions executable through various computer means and recorded in a computer-readable medium. The computer-readable medium may include program instructions, data files, data structures, etc., alone or in combination. The program instructions recorded in the computer-readable medium may be specially designed and formed for the example embodiments of the present invention, or may be known to and used by those skilled in the art of the computer software field.

The computer-readable medium may be a hardware device specially configured to store and execute program instructions, such as a read only memory (ROM), a random access memory (RAM), or a flash memory. The hardware device may be configured to operate as at least one software module to perform the operation according to example embodiments of the present invention, and vice versa. The program instruction may be mechanical codes as made by a compiler, as well as high-level language codes executable by a computer based on an interpreter or the like.

While the example embodiments of the present invention and their advantages have been described in detail, it should be understood that various changes, substitutions and alterations may be made herein without departing from the scope of the invention.

What is claimed is:

1. A method performed by a wireless device of transmitting an acknowledgement in a wireless communications system,
    receiving a frame from an access point, wherein the frame elicits an acknowledgement;
    generating the acknowledgement in response to receiving the frame, the acknowledgement comprising:
        i) a traffic identifier (TID) information when the acknowledgment is associated with a response to a VHT single A-MPDU (Aggregate MAC (Medium Access Control) Protocol Data Unit including only one MPDU), wherein when the acknowledgment is associated with responses to a plurality of VHT single A-MPDUs, respective TID information is included for each of TIDs associated with acknowledgment to the plurality of VHT single A-MPDUs, and
        ii) one or more block acknowledgement (BA) information when the acknowledgement is associated with a response to an A-MPDU (Aggregate MPDU), the A-MPDU including a plurality of MPDUs, wherein a respective BA information is included for each of TIDs associated with acknowledgement to the A-MPDU, each of the BA information comprising a TID information, a starting sequence control information, and a BA bitmap; and
    transmitting the acknowledgement to the access point.

2. The method of claim 1, wherein the frame comprises two or more MPDUs which belong to two or more TIDs.

3. The method of claim 1, wherein the VHT single A-MPDU solicits an immediate acknowledgement.

4. The method of claim 1, wherein the A-MPDU solicits an immediate block acknowledgement.

5. The method of claim 1, where the frame is a BlockAck Request frame.

6. The method of claim 1, wherein a number of TID information is identical to a number of TID associated with the acknowledgement to the frame.

7. The method of claim 1, wherein the BA bitmap comprises a bitmap indicating whether each of corresponding MPDUs is successfully received or not.

8. The method of claim 1, wherein the starting sequence control information is indicative of a sequence number of a first MPDU among MPDUs indicated by the BA bitmap.

9. A station for communication in a wireless network, the station comprising:
    one or more memories; and
    one or more processors coupled to the one or more memories, the one or more processors configured to cause:
        receiving a frame from an access point, wherein the frame elicits an acknowledgement;
        generating the acknowledgement in response to receiving the frame, wherein the acknowledgement comprising:
            i) a traffic identifier (TID) information when the acknowledgment is associated with a response to a VHT single A-MPDU (Aggregate MAC (Medium Access Control) Protocol Data Unit including only one MPDU), and
            ii) a block acknowledgement (BA) information when the acknowledgement is associated with a response to an A-MPDU (Aggregate MPDU), the A-MPDU including a plurality of MPDUs, the BA information comprises a TID information, a starting sequence control information, and a BA bitmap; and
        transmitting the acknowledgement to the access point, wherein respective TID information or respective BA information is included in the acknowledgement for each of TIDs associated with acknowledgement to the frame.

10. The station of claim 9, wherein the frame comprises two or more MPDUs which belong to two or more TIDs.

11. The station of claim 9, wherein the VHT single A-MPDU solicits an immediate acknowledgement.

12. The station of claim 9, wherein the A-MPDU solicits an immediate block acknowledgement.

13. The station of claim 9, where the frame is a BlockAck Request frame.

14. The station of claim 9, wherein a number of TID information is identical to a number of TID associated with the acknowledgement to the frame.

15. The station of claim 9, wherein the BA bitmap comprises a bitmap indicating whether each of corresponding MPDUs is successfully received or not.

16. The station of claim 9, wherein the starting sequence control information is indicative of a sequence number of a first MPDU among MPDUs indicated by the BA bitmap.

17. A computer-implemented method of facilitating communication by a wireless device in a wireless network, the method comprising:
    receiving a frame from an access point, wherein the frame elicits an acknowledgement;
    generating the acknowledgement in response to receiving the frame, wherein the acknowledgement comprising:
        i) a traffic identifier (TID) information when the acknowledgment is associated with a response to a VHT single A-MPDU (Aggregate MAC (Medium Access Control) Protocol Data Unit including only one MPDU), and ii) a block acknowledgement (BA) information when the acknowledgement is associated with a response to an A-MPDU (Aggregate MPDU), the A-MPDU including a plurality of MPDUs, the BA information comprises a TID information, a starting sequence control information, and a BA bitmap, and transmitting the acknowledgement to the access point, wherein respective TID information or respective BA information is included in the acknowledgement for each of TIDs associated with acknowledgement to the frame.

18. The method of claim 17, wherein the frame comprises two or more MPDUs which belong to two or more TIDs.

19. The method of claim 17, wherein a number of TID information is identical to a number of TID associated with the acknowledgement to the frame.

* * * * *